United States Patent
Kim et al.

(10) Patent No.: US 12,254,591 B2
(45) Date of Patent: *Mar. 18, 2025

(54) AI DOWNSCALING APPARATUS AND OPERATING METHOD THEREOF, AND AI UPSCALING APPARATUS AND OPERATING METHOD THEREOF

(71) Applicant: SAMSUNG ELECTRONICS CO., LTD., Suwon-si (KR)

(72) Inventors: Wookhyung Kim, Suwon-si (KR); Ilhyun Cho, Suwon-si (KR); Jayoon Koo, Suwon-si (KR); Namuk Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/638,310

(22) Filed: Apr. 17, 2024

(65) Prior Publication Data
US 2024/0265493 A1   Aug. 8, 2024

Related U.S. Application Data

(63) Continuation of application No. 17/312,276, filed as application No. PCT/KR2021/000346 on Jan. 11, 2021, now Pat. No. 11,989,852.

(30) Foreign Application Priority Data

Apr. 14, 2020   (KR) ........................ 10-2020-0045233

(51) Int. Cl.
*G06T 3/4046* (2024.01)
*G06T 3/4053* (2024.01)

(52) U.S. Cl.
CPC .......... *G06T 3/4046* (2013.01); *G06T 3/4053* (2013.01)

(58) Field of Classification Search
CPC ................. G06T 3/4046; G06T 3/4053; G06T 2207/20081; G06T 2207/20084;
(Continued)

(56) References Cited

U.S. PATENT DOCUMENTS

| 9,230,303 B2 | 1/2016 | Kanaev et al. |
| 2018/0249158 A1 | 8/2018 | Huang et al. |

(Continued)

FOREIGN PATENT DOCUMENTS

| KR | 10-2018-0001428 A | 1/2018 |
| KR | 10-1885855 B1 | 8/2018 |

(Continued)

OTHER PUBLICATIONS

Kim, Jaehwan, et al. "Dynamic frame resizing with convolutional neural network for efficient video compression." Applications of Digital Image Processing XL. vol. 10396. SPIE, 2017. (Year: 2017).*

(Continued)

*Primary Examiner* — Geoffrey E Summers
(74) *Attorney, Agent, or Firm* — Sughrue Mion, PLLC

(57) ABSTRACT

An artificial intelligence (AI) upscaling apparatus for upscaling a low-resolution image to a high-resolution image includes: a memory storing one or more instructions; and a processor configured to execute the one or more instructions stored in the memory, wherein the processor is configured to: obtain a second image corresponding to a first image, which is downscaled from an original image by an AI downscaling apparatus by using a first deep neural network (DNN); and obtain a third image by upscaling the second image by using a second DNN corresponding to the first DNN, and wherein the second DNN is trained to minimize a difference between a first restored image, which results from applying no pixel movement to an original training (Continued)

image, and second restored images, which result from downscaling, upscaling, and subsequently retranslating one or more translation images obtained by applying pixel movement to the original training image.

15 Claims, 17 Drawing Sheets

(58) Field of Classification Search
CPC ........ G06N 3/045; G06N 3/0455; G06N 3/08; G06N 3/0895; G06N 3/09; G06N 3/091; G06N 3/092; G06N 3/094; G06N 3/096; G06N 3/098; G06N 3/0985
See application file for complete search history.

(56) References Cited

U.S. PATENT DOCUMENTS

| | | |
|---|---|---|
| 2019/0230354 A1 | 7/2019 | Kim |
| 2021/0058653 A1 | 2/2021 | Jang |

FOREIGN PATENT DOCUMENTS

| | | | |
|---|---|---|---|
| KR | 10-2018-0100976 A | 9/2018 | |
| KR | 10-2019-0062283 A | 6/2019 | |
| KR | 10-2019-0130479 A | 11/2019 | |

OTHER PUBLICATIONS

Eilertsen, Gabriel, Rafat K. Mantiuk, and Jonas Unger. "Single-frame Regularization for Temporally Stable CNNs." arXiv preprint arXiv:1902.10424v2 (2019). (Year: 2019).*
Caballero et al., "Real-Time Video Super-Resolution with Spatio-Temporal Networks and Motion Compensation," Computer Vision Foundation, 2017, pp. 4778-4787.
Connor Shorten et al, "A survey on Image Data Augmentation for Deep Learning," XP055925282, dated Jul. 7, 2019, 48 total pages.
European Search Report, dated Jan. 5, 2023, issued by the European Patent Office, Application No. 21788636.5.
Ghazi et al., "Recursive Sketches for Modular Deep Learning," Google Research, googblogs.com, Nov. 6, 2019, Total 4 pages.
Heewon Kim et al, "Task-Aware Image Downscaling," Department of ECE, ASRI Seoul University Seoul Korea, XP055857073, dated Sep. 8, 2019, 16 total pages.
International Search Report (PCT/ISA/210) dated Apr. 15, 2021, issued by the International Searching Authority in counterpart International Application No. PCT/KR2021/000346.
Communication dated Mar. 31, 2024 issued by the Korean Intellectual Property Office in Korean Application No. 10-2020-0045233.
Wanjie Sun et al, "Learned Image Downscaling for Upscaling Using Content Adaptive Resampler," IEEE Transaction on Image Processing vol. 29 2020, XP055925282, dated Jul. 9, 2019, 14 total pages.
Written Opinion (PCT/ISA/237) dated Apr. 15, 2021, issued by the International Searching Authority in counterpart International Application No. PCT/KR2021/000346.
Eilertsen, Gabriel, Ratal K. Mantiuk, and Jonas Unger. "Single-frame Regularization for Temporally Stable CNNs." arXiv preprint arXiv:1902.10424v2 (2019). (Year: 2019).
Gorodilov, Artem, Dmitriy Gavrilov, and Dmitriy Schelkunov. "Neural networks for image and video compression." 2018 International Conference on Artificial Intelligence Applications and Innovations (IC-AIAI). IEEE, 2018. (Year: 2018).
Li, Yue, et al. "Learning a convolutional neural network for image compact-resolution." IEEE Transactions on Image Processing 28.3 (2018): 1092-1107. (Year: 2018).

* cited by examiner

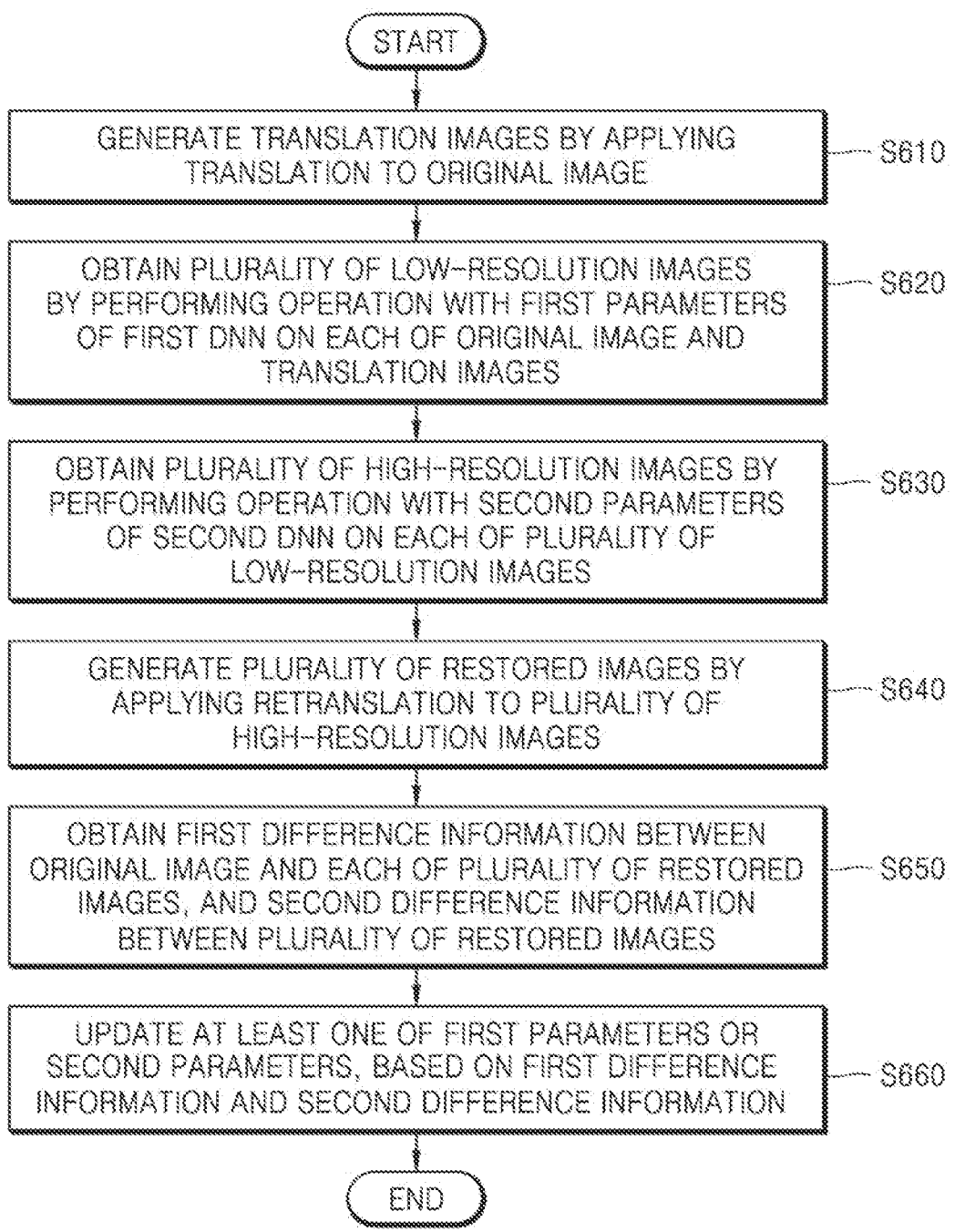

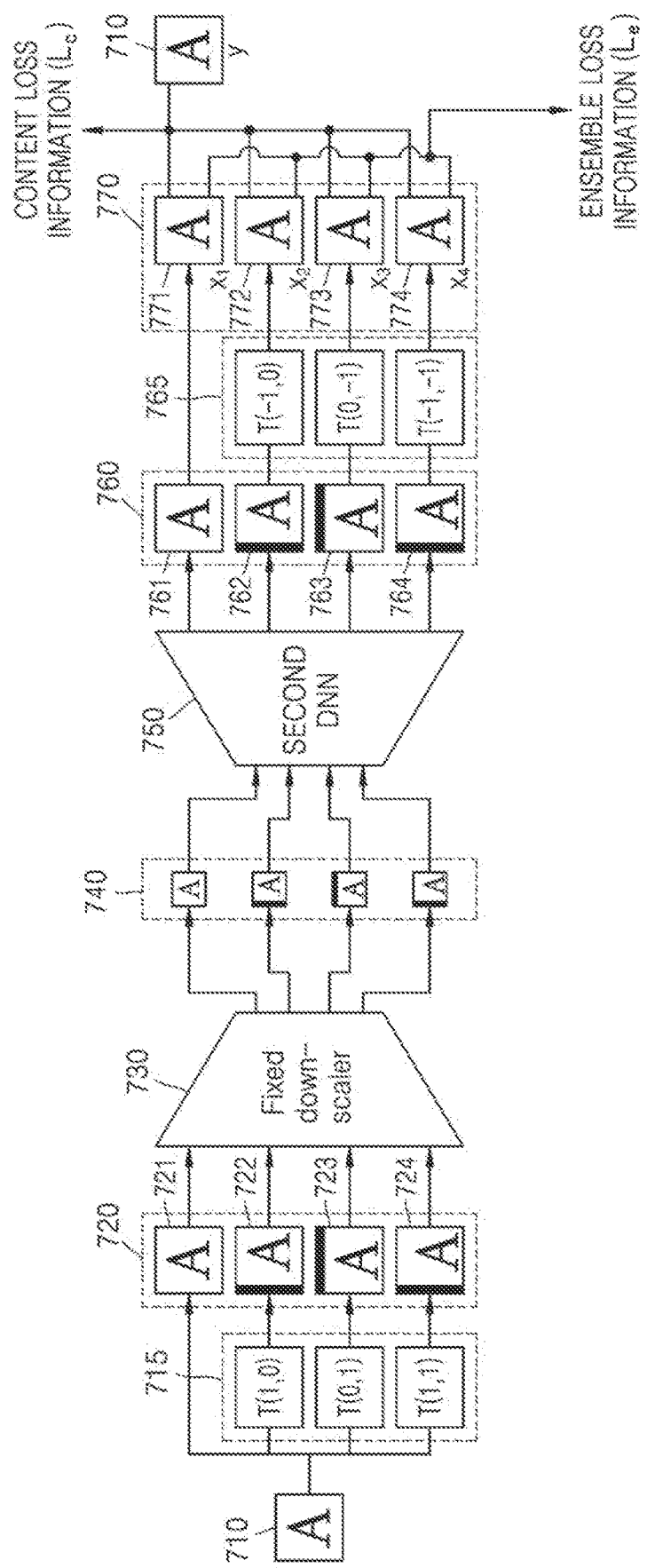

AI DOWNSCALING APPARATUS AND OPERATING METHOD THEREOF, AND AI UPSCALING APPARATUS AND OPERATING METHOD THEREOF

CROSS REFERENCE TO RELATED APPLICATION

This application is a Continuation of U.S. application Ser. No. 17/312,276, filed on Jun. 9, 2021, which is a National Stage Entry of PCT/KR2021/000346, filed on Jan. 11, 2021, which claims priority to Korean Patent Application No. 10-2020-0045233, filed on Apr. 14, 2020 in the Korean Intellectual Property Office, the contents of which are incorporated by reference herein in their entireties.

TECHNICAL FIELD

Various embodiments of the present disclosure relate to an artificial intelligence (AI) downscaling apparatus including a deep neural network for AI-downscaling an image and an operating method thereof, and an AI upscaling apparatus including a deep neural network for AI-upscaling an image and an operating method thereof, and more particularly, to an AI downscaling apparatus and an operating method thereof and an AI upscaling apparatus and an operating method thereof for removing artifacts generated in an image in processes of downscaling and upscaling the image.

BACKGROUND ART

Images are encoded by codecs conforming to certain compression standards, for example, Moving Picture Expert Group (MPEG) standards and the like, and then, in bitstream formats, stored in recording media or transmitted through communication channels.

As hardware capable of reproducing and storing high-resolution/high-quality images has been developed and spread, there is an increasing need for codecs capable of efficiently encoding and decoding high-resolution/high-quality images.

Recently, to improve the transmission efficiency of high-quality images and achieve the differentiated restoration image quality, AI deep learning techniques have also been applied to the fields of image streaming and restoration.

When images are downscaled to low resolution and then upscaled back to high resolution, artifacts are caused by information lost during the downscaling to low resolution. That is, when original images are converted into low resolution and restored back to high resolution, because information for configuring pixels are unavoidably lost, images restored to high resolution are not identical to the original images and suffer from image quality deterioration.

In existing image streaming, to remove artifacts, processing for estimating and compensating for motion between frames has been performed. However, to perform motion estimation and compensation processing, additional hardware devices are required, overall systems need to be changed, and a cost increase is caused.

DESCRIPTION OF EMBODIMENTS

Solution to Problem

Various embodiments of the present disclosure may provide an artificial intelligence (AI) downscaling apparatus and an operating method thereof, and an AI upscaling apparatus and an operating method thereof, which allow artifacts to be removed during the process of restoring an AI-downscaled image by AI-upscaling the AI-downscaled image. In addition, various embodiments of the present disclosure may also provide methods of training the AI downscaling apparatus and the AI upscaling apparatus, which are capable of removing artifacts.

Advantageous Effects of Disclosure

An AI downscaling apparatus and an AI upscaling apparatus, according to an embodiment of the present disclosure, may restore images to high-resolution images from which artifacts are removed, without adding additional hardware to existing AI downscaling apparatuses and AI upscaling apparatuses, changing existing hardware, or incurring additional costs.

BRIEF DESCRIPTION OF THE DRAWINGS

FIG. 6 is a flowchart illustrating a method of training a first DNN and a second DNN, according to an embodiment of the present disclosure.

FIGS. 7A to 7E are diagrams for reference to illustrate a method of training a first DNN for AI downscaling and a second DNN for AI upscaling, according to an embodiment of the present disclosure.

DETAILED DESCRIPTION

Figure 1:
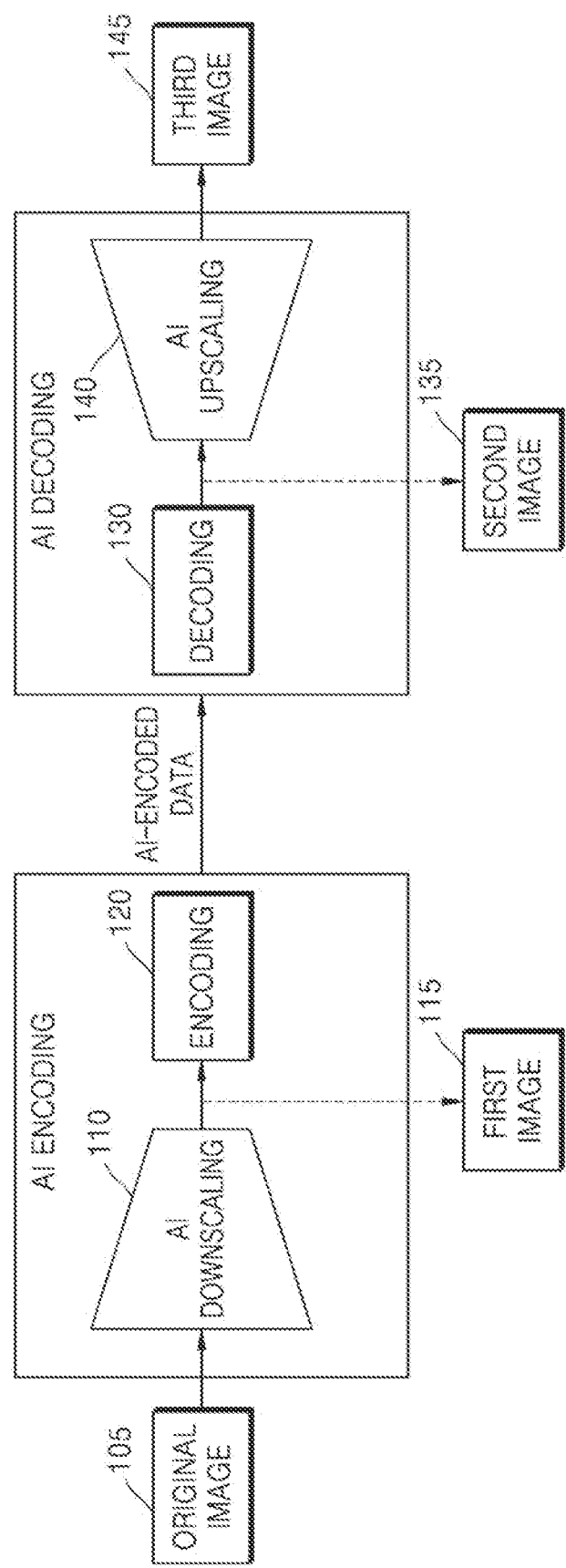
FIG. 1 is a diagram illustrating an artificial intelligence (AI) encoding process and an AI decoding process, according to an embodiment of the present disclosure.

According to an aspect of the present disclosure, an AI upscaling apparatus includes: a memory storing one or more instructions; and a processor configured to execute the one or more instructions stored in the memory, wherein the processor is configured to execute the one or more instructions to: obtain a second image corresponding to a first image, which is downscaled from an original image by an AI downscaling apparatus by using a first deep neural network (DNN); and obtain a third image by upscaling the second image by using a second DNN corresponding to the first DNN, and wherein the second DNN is trained to minimize a difference between a first restored image for an original training image and second restored images for one or more translation images, the first restored image being obtained by performing downscaling and upscaling on an image that is obtained by applying no pixel movement to the original training image, and the second restored images being obtained by performing downscaling and upscaling and subsequently performing retranslation on the one or more translation images that are obtained by applying pixel movement to the original training image.

According to an embodiment of the present disclosure, the second DNN may be trained to minimize loss information obtained based on at least one of the original training image, the first restored image for the original training image, or the second restored images for the one or more translation images.

According to an embodiment of the present disclosure, the loss information may include first difference information between the original training image and each of the first restored image and the second restored images.

According to an embodiment of the present disclosure, the loss information may include second difference information between the first restored image and the second restored images.

According to an embodiment of the present disclosure, the second DNN may receive, as an input, a low-resolution single frame image for a particular time point in the second image and outputs a high-resolution single frame image for the particular time point in the third image.

According to an embodiment of the present disclosure, the second DNN may include a network that is trained jointly with the first DNN and trained based on an image obtained from the first DNN.

According to another aspect of the present disclosure, an AI downscaling apparatus includes: a memory storing one or more instructions; and a processor configured to execute the one or more instructions stored in the memory, wherein the processor is configured to execute the one or more instructions to: obtain a first image downscaled from an original image by using a first deep neural network (DNN); and perform control to transmit the first image to an AI upscaling apparatus through a network, and wherein the first DNN is trained to minimize a difference between a first restored image for an original training image and second restored images for one or more translation images, the first restored image being obtained by performing downscaling and upscaling on an image that is obtained by applying no pixel movement to the original training image, and the second restored images being obtained by performing downscaling and upscaling and subsequently performing retranslation on the one or more translation images that are obtained by applying pixel movement to the original training image.

According to an embodiment of the present disclosure, the first DNN may be trained to minimize loss information obtained based on at least one of the original training image, the first restored image for the original training image, or the second restored images for the one or more translation images.

According to yet another aspect of the present disclosure, a method of training a first deep neural network (DNN) for downscaling a high-resolution image to a low-resolution image or a second DNN for upscaling a low-resolution image to a high-resolution image includes: generating one or more translation images by applying translation to an original training image; obtaining a plurality of low-resolution images corresponding to the original training image and the one or more translation images by performing an operation with the first DNN on the original training image and the one or more translation images; obtaining a plurality of high-resolution images corresponding to the plurality of low-resolution images by performing an operation with the second DNN on each of the plurality of low-resolution images; obtaining second restored images by applying retranslation to high-resolution images corresponding to the one or more translation images from among the plurality of high-resolution images; and updating at least one of first parameters of the first DNN or second parameters of the second DNN by using loss information obtained based on at least one of the original training image, a first restored image for the original training image, or the second restored image for the one or more translation images.

According to an embodiment of the present disclosure, the updating of at least one of the first parameters of the first DNN or the second parameters of the second DNN may include updating at least one of the first parameters of the first DNN or the second parameters of the second DNN toward minimizing the loss information.

According to an embodiment of the present disclosure, the second DNN may include a network that is trained jointly with the first DNN and trained based on an image obtained from the first DNN.

MODE OF DISCLOSURE

The present disclosure may have various changes thereto and have various embodiments, and specific embodiments of the present disclosure are illustrated in the accompanying drawings and will be described in detail in the following detailed description. However, it should be appreciated that the present disclosure is not limited to these embodiments and all changes, equivalents or replacements thereto belong to the scope of the present disclosure.

In describing the embodiments, when it is determined that specific descriptions of related known techniques may make the gist of the present disclosure unnecessarily unclear, detailed descriptions thereof are omitted. In addition, the terms such as "first", "second" and the like used herein to describe various components may be used only to distinguish one component from another component.

Herein, it should be understood that, when one component is referred to as being "coupled to" or "connected to" another component, the one component may be directly coupled to or directly connected to the other component or may be coupled to or connected to the other component with an intervening component therebetween, unless otherwise stated.

Herein, when a component is represented by the term such as " . . . unit", " . . . portion", " . . . module", or the like, two or more components may be integrated into one integrated component, or one component may be sub-divided into two or more sub-components according to functionality. In addition, regarding respective components described below, a component may additionally perform some or all of functions of another component, or some of functions of the component may be wholly responsible for and performed by the other component.

As used herein, the term "image" or "picture" may refer to a still image, a moving image including a plurality of consecutive still images (or frames), or a video.

As used herein, the term "deep neural network (DNN)" is a representative example of an artificial neural network model imitating cranial nerves and is not limited to an artificial neural network model that uses a particular algorithm.

As used herein, the term "parameter" refers to a value used in an operation process of each layer constituting a neural network and may include, for example, a weight value used when an input value is applied to a certain operation expression. In addition, a parameter may be represented in a matrix form. The parameter is a value that is set as a result of training, and may be updated by using separate training data, as needed.

As used herein, the term "first DNN" refers to a DNN used to AI-downscale an image, and the term "second DNN" refers to a DNN used to AI-upscale an image.

In addition, the term "DNN setting information" used herein refers to information related to elements constituting DNN and includes the parameter set forth above. A first DNN or a second DNN may be established by using DNN setting information.

As used herein, the term "original image" refers to an image targeted by AI encoding, and the term "first image" refers to an image obtained as a result of AI-downscaling an original image in the process of AI encoding. In addition, as used herein, the term "second image" refers to an image obtained through first decoding in the process of AI decoding, and the term "third image" refers to an image obtained by AI-upscaling a second image in the process of AI decoding.

As used herein, the term "AI downscaling" refers to a process of reducing a resolution of an image based on AI, and the term "first encoding" refers to an encoding process by an image compression method that is based on frequency conversion. In addition, as used herein, the term "first decoding" refers to a decoding process by an image restoration method that is based on frequency conversion, and the term "AI upscaling" refers to a process of increasing a resolution of an image based on AI.

As used herein, the term "artifact" refers to image quality deterioration occurring due to a difference in information between a restored image and an original image, when the original image with a high resolution is converted into a low resolution and restored back to a high resolution. Artifacts are caused by information lost when an original image is converted into a low resolution. The artifacts may include, but are not limited to, aliasing artifacts and jagging artifacts.

As used herein, the term "movement" or "translation" refers to moving an image or a pixel of an image. For a direction of translation, a horizontal, vertical, or diagonal direction may be considered, and for the magnitude of translation, movement by as much as one pixel, two pixels, or the like on a pixel basis may be considered. For example, moving an original image or an image by as much as one pixel (one unit magnitude) in a horizontal direction (1,0), a vertical direction (0,1), or a diagonal direction (1,1) may be considered.

As used herein, the term "reverse movement" or "retranslation" refers to moving an image or a pixel of an image, which has been translated, in the reverse direction by as much as the same magnitude. For example, when an original image or an image has been translated by as much as one pixel (one unit magnitude) in a horizontal direction (1,0), a vertical direction (0,1), or a diagonal direction (1,1), retranslation may be considered as moving by as much as one pixel (one unit magnitude) in the reverse direction with respect to the horizontal direction (−1,0), the vertical direction (0,−1), or the diagonal direction (−1,−1).

FIG. 1 is a diagram illustrating an AI encoding process and an AI decoding process, according to an embodiment of the present disclosure.

As resolutions of images have been sharply increased, an amount of information processing for encoding/decoding has increased, and thus, there is a need for a method of improving the efficiency of encoding and decoding images.

As shown in FIG. 1, according to an embodiment of the present disclosure, a first image 115 is obtained by AI downscaling 110 of an original image 105 with a high resolution. Here, the original image 105 and the first image 115 may each be a moving image or a video, which includes a plurality of frame images. In addition, because encoding 120 and decoding 130 are performed on the first image 115 with a relatively low resolution, a processing bit rate may be significantly reduced as compared with the case of performing encoding and decoding on the original image 105.

Referring to FIG. 1, in the AI encoding process, the first image 115 is obtained by the AI downscaling 110 of the original image 105, and the first image 115 is encoded 120. In the AI decoding process, AI-encoded data including AI data and image data, which are obtained as a result of the AI encoding, is received, a second image 135 is obtained through decoding 130, and a third image 145 is obtained by AI upscaling 140 of the second image 135.

For a more detailed description of the AI encoding process, when the original image 105 is received as an input, the original image 105 is AI-downscaled 110 to obtain the first image 115 with a certain resolution or certain image quality. Here, the AI downscaling 110 is performed based on AI, and AI for the AI downscaling 110 needs to be trained jointly with AI for the AI upscaling 140. The reason is because, when the AI for the AI downscaling 110 and the AI for the AI upscaling 140 are trained separately from each other, a difference between the original image 105, which is targeted by AI encoding, and the third image 145, which is restored through AI decoding, is increased.

In an embodiment of the present disclosure, to maintain such a joint relationship in the AI encoding process and the AI decoding process, the AI data may be used. Therefore, the AI data obtained through the AI encoding process needs to include information indicating an upscaling target, and in the AI decoding process, the second image 135 needs to be AI-upscaled 140 according to the upscaling target identified based on the AI data.

The AI for the AI downscaling 110 and the AI for the AI upscaling 140 may each be implemented by a deep neural network (DNN). As described below with reference to FIGS. 6 and 7, because a first DNN and a second DNN are jointly trained to achieve a certain target by sharing loss information, an AI encoding apparatus may provide, to an AI decoding apparatus, target information used when the first DNN and the second DNN are jointly trained, and the AI decoding apparatus may AI-upscale 140 the second image 135 to a targeted resolution, based on the provided target information.

For a detailed description of the encoding 120 and the decoding 130 shown in FIG. 1, an amount of information of the first image 115, which is AI-downscaled 110 from the original image 105, may be reduced through the encoding 120. Such an encoding 120 process may be implemented by one of image compression methods using frequency conversion, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be restored through the decoding 130 of the image data. Such a decoding 130 process may be implemented through an image restoration method corresponding to one of image compression methods using frequency conversion, such as MPEG-2, H.264, MPEG-4, HEVC, VC-1, VP8, VP9, and AV1.

The AI-encoded data obtained through the AI encoding process may include the image data, which is obtained as a result of the encoding 120 of the first image 115, and the AI data, which is related to the AI downscaling 110 of the original image 105. The image data may be used in the process of the first decoding 130, and the AI data may be used in the process of the AI upscaling 140.

The image data may be transmitted in a bitstream format. The image data may include data obtained based on pixel values in the first image 115, for example, residual data that is a difference between the first image 115 and predicted data of the first image 115.

The AI data is used for the AI upscaling 140 that is based on the second DNN. As described above, because the first DNN and the second DNN are jointly trained, the AI data includes information allowing the AI upscaling 140 of the second image 135 by the second DNN to be accurately performed. In the AI decoding process, the second image 135 may be AI-upscaled 140 to the targeted resolution and/or image quality, based on the AI data. The AI data, together with the image data, may be transmitted in a bitstream format. Alternatively, according to implementation examples, the AI data may be transmitted in a frame or packet format, separately from the image data. The image data and the AI data, which are obtained as a result of the AI encoding, may be transmitted through the same network or different networks from each other.

Figure 2:
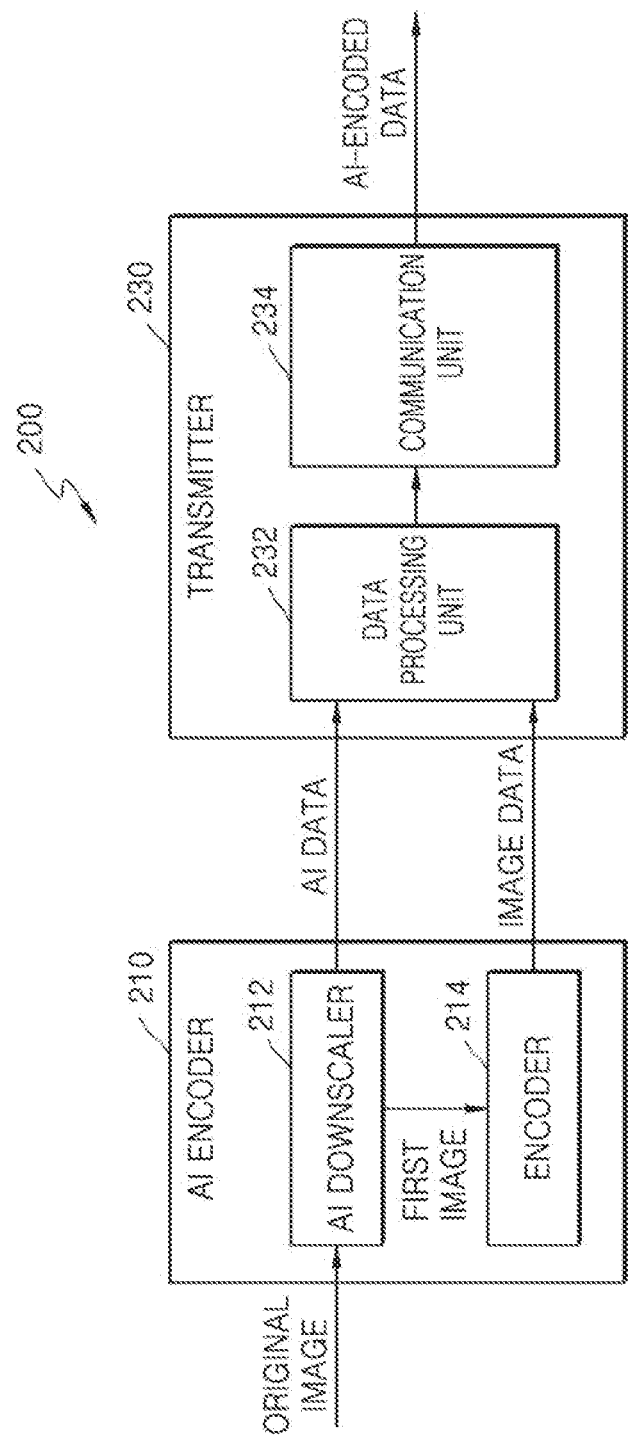
FIG. 2 is a block diagram illustrating a configuration of an AI downscaling apparatus, according to an embodiment of the present disclosure.

FIG. 2 is a block diagram illustrating a configuration of an AI downscaling apparatus according to an embodiment of the present disclosure.

Referring to FIG. 2, an AI downscaling apparatus 200 may include an AI encoder 210 and a transmitter 230. The AI encoder 210 may include an AI downscaler 212 and an encoder 214. The transmitter 230 may include a data processing unit 232 and a communication unit 234.

Although FIG. 2 illustrates that the AI encoder 210 and the transmitter 230 are respectively individual devices, the AI encoder 210 and the transmitter 230 may be implemented by one processor. In this case, the one processor may be implemented by a dedicated processor or a combination of a general-purpose processor, such as an application processor (AP), a central processing unit (CPU), or a graphics processing unit (GPU), and software (S/W). In addition, the dedicated processor may be implemented to include a memory for implementing an embodiment of the present disclosure, or may be implemented to include a memory processing unit for using an external memory.

Further, the AI encoder 210 and the transmitter 230 may also be implemented by a plurality of processors. In this case, the plurality of processors may be implemented by a combination of dedicated processors, or may be implemented by a combination of a plurality of general-purpose processors, such as APs, CPUs, or GPUs, and S/W. The AI downscaler 212 and the encoder 214 may be respectively implemented by different processors.

The AI encoder 210 performs AI downscaling of the original image 105 and encoding of the first image 115 and transfers AI data and image data to the transmitter 230. The transmitter 230 transmits the AI data and the image data to an AI upscaling apparatus.

The image data includes data obtained as a result of the encoding of the first image 115. The image data may include data obtained based on pixel values in the first image 115, for example, residual data that is a difference between the first image 115 and predicted data of the first image 115. In addition, the image data includes pieces of information used in the process of encoding the first image 115. For example, the image data may include prediction mode information used to encode the first image 115, quantization parameter-related information used to encode motion information and the first image 115, and the like.

The AI data includes pieces of information allowing the AI upscaling apparatus to AI-upscale the second image 135 to an upscaling target that corresponds to a downscaling target of the first DNN. In one example, the AI data may include difference information between the original image 105 and the first image 115. In addition, the AI data may include first image 115-related information. The first image 115-related information may include information about at least one of the resolution of the first image 115, a bit rate of the image data obtained as a result of encoding the first image 115, or a codec type used in encoding the first image 115.

In an embodiment of the present disclosure, the AI data may include an identifier of DNN setting information mutually agreed to allow the second image 135 to be AI-upscaled to the upscaling target that corresponds to the downscaling target of the first DNN.

In addition, in an embodiment of the present disclosure, the AI data may include DNN setting information capable of being set in the second DNN.

The AI downscaler 212 may obtain the first image 115 AI-downscaled from the original image 105 through the first DNN. The AI downscaler 212 may determine a downscaling target of the original image 105 based on a preset criterion.

To obtain the first image 115 conforming to the downscaling target, the AI downscaler 212 may store a plurality of pieces of DNN setting information capable of being set in the first DNN. The AI downscaler 212 obtains a piece of DNN setting information corresponding to the downscaling target from among the plurality of pieces of DNN setting information, and AI-downscales the original image 105 through the first DNN that is set with the obtained piece of DNN setting information.

Each of the plurality of pieces of DNN setting information may be trained to obtain the first image 115 with a preset resolution and/or preset image quality. For example, among the plurality of pieces of DNN setting information, one piece of DNN setting information may include pieces of information for obtaining the first image 115 with a resolution ½ times lower than the resolution of the original image 105, for example, pieces of information for obtaining the first image 115 with a 2K (2048*1080) resolution ½ times lower than a 4K (4096*2160) resolution of the original image 105, and another piece of DNN setting information may include pieces of information for obtaining the first image 115 with a resolution ¼ times lower than the resolution of the original image 105, for example, pieces of information for obtaining the first image 115 with a 2K (2048*1080) resolution ¼ times lower than an 8K (8192*4320) resolution of the original image 105.

According to implementation examples, when pieces of information (for example, the number of convolution layers, the number of filter kernels for each convolution layer, parameters of each filter kernel, and the like) constituting the DNN setting information are stored in the format of a lookup table, the AI downscaler 212 may obtain the DNN setting information by combining some values selected from among values in the lookup table according to the downscaling target and may AI-downscale the original image 105 by using the obtained DNN setting information.

According to implementation examples, the AI downscaler 212 may determine a structure of a DNN corresponding to the downscaling target and may obtain DNN setting information corresponding to the determined structure of the DNN, for example, parameters of a filter kernel.

The plurality of pieces of DNN setting information for AI-downscaling the original image 105 may have optimized values by jointly training the first DNN and the second DNN. Here, each piece of DNN setting information includes at least one of the number of convolution layers included in the first DNN, the number of filter kernels for each convolution layer, or parameters of each filter kernel.

The AI downscaler 212 may set the first DNN with the piece of DNN setting information determined for AI-downscaling the original image 105 and obtain the first image 115 with a certain resolution and/or certain image quality through the first DNN. When the piece of DNN setting information for AI-downscaling the original image 105 from among the plurality of pieces of DNN setting information is obtained, each layer in the first DNN may process input data based on pieces of information included in the piece of DNN setting information.

Hereinafter, an example structure of a first DNN 300, which is the foundation of AI downscaling, will be described with reference to FIG. 3.

Figure 3:
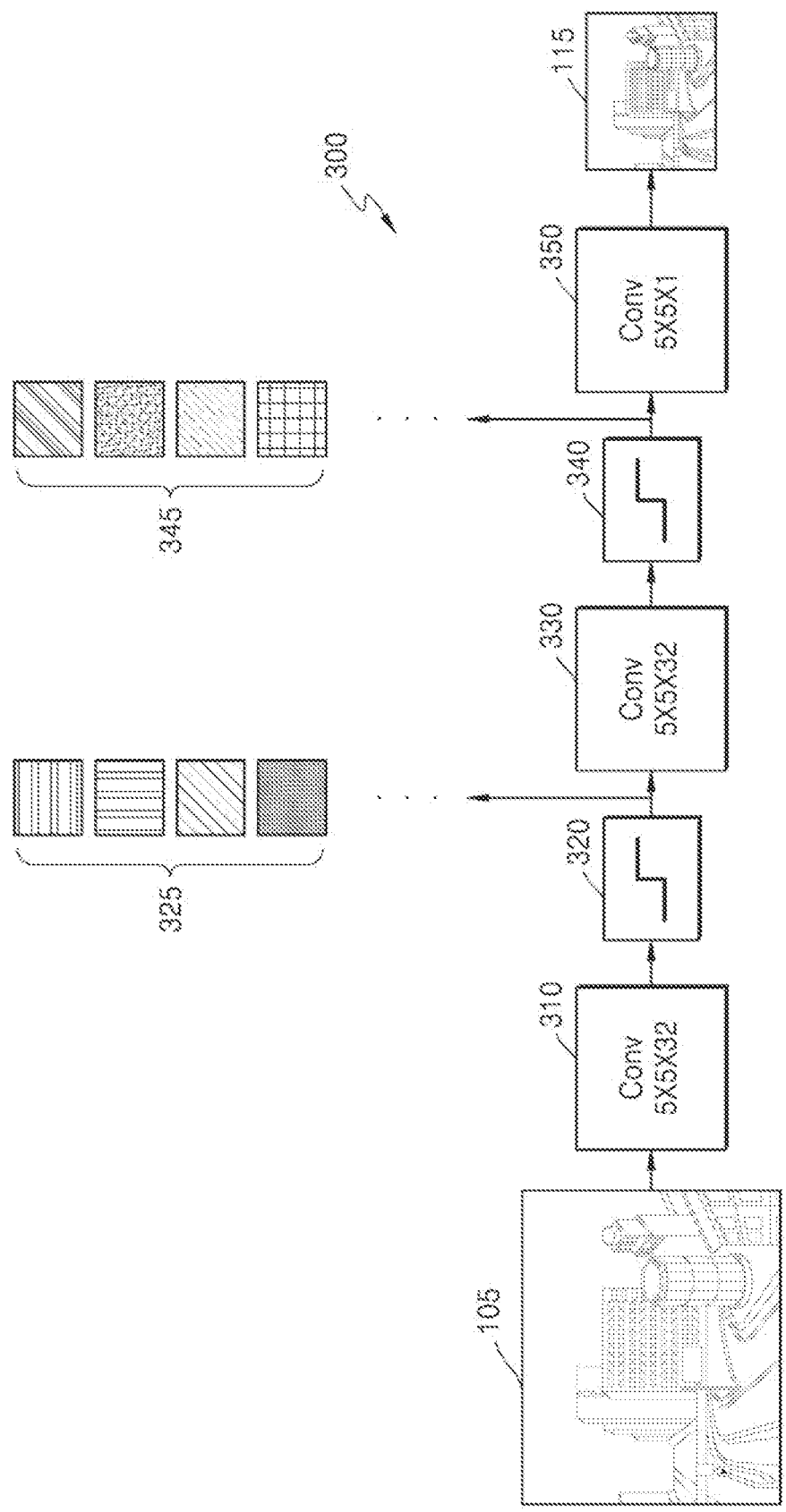
FIG. 3 is an example diagram illustrating a first DNN for AI downscaling an original image.

FIG. 3 is an example diagram illustrating the first DNN 300 for AI-downscaling the original image 105.

As shown in FIG. 3, the original image 105 is input to a first convolution layer 310. The first convolution layer 310 performs convolution processing on the original image 105 by using 32 5×5-size filter kernels. According to the present disclosure, values of parameters of the first DNN 300, for example, values of parameters of filter kernels used in convolution layers of the first DNN 300, may be optimized through the joint training of the first DNN and the second DNN.

32 feature maps generated as a result of the convolution processing are input to a first activation layer 320. The first activation layer 320 may impart nonlinear characteristics to the 32 feature maps. The first activation layer 320 may include, but is not limited to, a sigmoid function, a Tan h function, a rectified linear unit (ReLU) function, or the like.

The first activation layer 320 determines whether to transfer sample values of the feature maps, which are output from the first convolution layer 310, to a second convolution layer 330. For example, among the sample values of the feature maps, some sample values are activated by the first activation layer 320 and transferred to the second convolution layer 330, and some sample values are deactivated by the first activation layer 320 and are not transferred to the second convolution layer 330. Information represented by the feature maps, which are output from the first convolution layer 310, is emphasized by the first activation layer 320.

An output 325 of the first activation layer 320 is input to the second convolution layer 330. The second convolution layer 330 performs convolution processing on input data by using 32 5×5-size filter kernels. 32 feature maps, which are output as a result of the convolution processing, are input to a second activation layer 340, and the second activation layer 340 may impart nonlinear characteristics to the 32 feature maps.

An output 345 of the second activation layer 340 is input to a third convolution layer 350. The third convolution layer 350 performs convolution processing on input data by using one 5×5-size filter kernel. One image may be output from the third convolution layer 350 as a result of the convolution processing. The third convolution layer 350 is a layer for outputting a final image and obtains one output by using one filter kernel. According to an example of the present disclosure, the third convolution layer 350 may output the first image 115 through a convolution operation result.

There may be a plurality of pieces of DNN setting information representing the number of filter kernels, parameters of filter kernels, and the like of each of the first convolution layer 310, the second convolution layer 330, and the third convolution layer 350 in the first DNN 300, and the plurality of pieces of DNN setting information need to be associated with a plurality of pieces of DNN setting information of the second DNN. The association between the plurality of pieces of DNN setting information of the first DNN and the plurality of pieces of DNN setting information of the second DNN may be implemented through the joint training of the first DNN and the second DNN.

Although FIG. 3 illustrates that the first DNN 300 includes the three convolution layers 310, 330, and 350 and the two activation layers 320 and 340, this is merely an example, and the number of convolution layers and the number of activation layers may be variously changed according to implementation examples. In addition, according to implementation examples, the first DNN 300 may be implemented by a recurrent neural network (RNN). This means changing a CNN structure of the first DNN 300 according to an example of the present disclosure into an RNN structure.

In an embodiment of the present disclosure, the AI downscaler 212 may include at least one arithmetic logic unit (ALU) for the above-described convolution operation and above-described operation of the activation layer. The ALU may be implemented by a processor. For the convolution operation, the ALU may include a multiplier for performing a multiplication operation between sample values of a feature map and sample values of a filter kernel and an adder for adding up result values of the multiplication, the feature map being output from the original image 105 or a previous layer. In addition, for the operation of the activation layer, the ALU may include a multiplier for multiplying an input sample value by a weight value used in a sigmoid function, a Tan h function, an ReLU function, or the like, which is preset, and a comparator for determining whether to transfer the input sample value to the next layer by comparing a result of the multiplication with a certain value.

Referring again to FIG. 2, the encoder 214, which receives the first image 115 transferred from the AI downscaler 212, may reduce the amount of information in the first image 115 by encoding the first image 115. The image data corresponding to the first image 115 may be obtained as a result of the encoding by the encoder 214.

The data processing unit 232 performs processing to allow at least one of the AI data or the image data to be transmitted in a certain format. For example, when the AI data and the image data need to be transmitted in a bitstream format, the data processing unit 232 processes the AI data to represent the AI data in a bitstream format, and transmits the AI data and the image data in the format of one bitstream through the communication unit 234. As another example, the data processing unit 232 processes the AI data to represent the AI data in a bitstream format, and transmits bitstreams respectively corresponding to the AI data and the image data through the communication unit 234. As yet another example, the data processing unit 232 processes the AI data to represent the AI data in a frame or packet format, and transmits the image data with a bitstream format and the AI data with a frame or packet format through the communication unit 234.

The communication unit 234 transmits AI-encoded data, which is obtained as a result of AI encoding, through a network. The AI-encoded data, which is obtained as a result of the AI encoding, includes the image data and the AI data. The image data and the AI data may be transmitted through a homogeneous network or heterogeneous networks.

In an embodiment of the present disclosure, the AI-encoded data, which is obtained as a result of the processing by the data processing unit 232, may be stored in data storage media including magnetic media such as hard disks, floppy disks, and magnetic tape, optical recording media such as CD-ROM and DVDs, magneto-optical media such as floptical disks, and the like.

Figure 4:
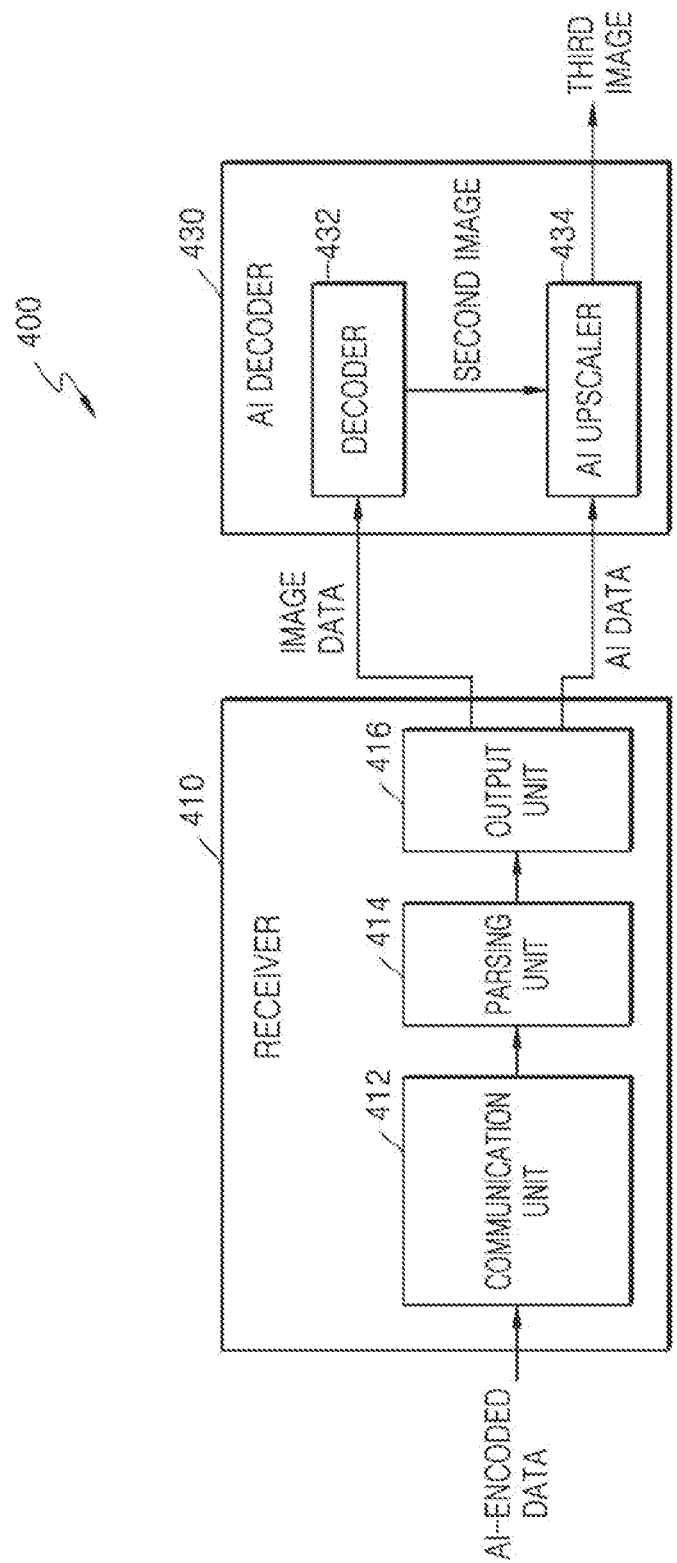
FIG. 4 is a block diagram illustrating a configuration of an AI-upscaling apparatus, according to an embodiment of the present disclosure.

FIG. 4 is a block diagram illustrating an AI upscaling apparatus 400 according to an embodiment of the present disclosure.

Referring to FIG. 4, the AI upscaling apparatus 400 according to an embodiment of the present disclosure may include a receiver 410 and an AI decoder 430. The receiver 410 may include a communication unit 412, a parsing unit 414, and an output unit 416. The AI decoder 430 may include a decoder 432 and an AI upscaler 434.

The receiver 410 receives and parses AI-encoded data obtained as a result of AI encoding, and outputs image data and AI data to the AI decoder 430 by separating the image data and the AI data from each other.

Specifically, the communication unit 412 receives the AI-encoded data, which is obtained as a result of the AI encoding, through a network. The AI-encoded data, which is obtained as a result of the AI encoding, includes the image data and the AI data. The image data and the AI data may be received through a homogeneous network or heterogeneous networks.

The parsing unit 414 receives the AI-encoded data, which is received by the communication unit 412, and divides the AI-encoded data into the image data and the AI data by parsing the AI-encoded data. For example, by reading a header of data obtained from the communication unit 412, it may be distinguished whether the data is the image data or the AI data. In one example, the parsing unit 414 transfers the image data and the AI data to the output unit 416 by dividing the image data and the AI data from each other by using the header of the data received by the communication unit 412, and transfers each divided piece of data to the decoder 432 and the AI upscaler 434. Here, the image data included in the AI-encoded data may be identified to be image data obtained through a certain codec (for example, MPEG-2, H.264, MPEG-4, HEVC, VC-1, VP8, VP9, or AV1). In this case, to allow the image data to be processed by the identified codec, the corresponding information may be transferred to the decoder 432 through the output unit 416.

In an embodiment of the present disclosure, the AI-encoded data, which the parsing unit 414 parses, may be obtained from data storage media including magnetic media such as hard disks, floppy disks, and magnetic tape, optical recording media such as CD-ROMs and DVDs, magneto-optical media such as floptical disks, and the like.

The decoder 432 restores the second image 135 corresponding to the first image 115, based on the image data. The second image 135 obtained by the decoder 432 is provided to the AI upscaler 434. According to implementation examples, decoding-related information, such as prediction mode information, motion information, or quantization parameter information, which is included in the image data, may be further provided to the AI upscaler 434.

The AI upscaler 434, which receives the AI data, AI-upscales the second image 135, based on the AI data. According to implementation examples, the AI upscaling may be performed by further using the decoding-related information, such as prediction mode information or quantization parameter information, which is included in the image data.

Although the receiver 410 and the AI decoder 430, according to an embodiment of the present disclosure, are described as individual devices, the receiver 410 and the AI decoder 430 may be implemented by one processor. In this case, the receiver 410 and the AI decoder 430 may be implemented by a dedicated processor or may be implemented by a combination of a general-purpose processor, such as an AP, a CPU, or a GPU, and S/W. In addition, the dedicated processor may be implemented to include a memory for implementing an embodiment of the present disclosure, or may be implemented to include a memory processing unit for using an external memory.

Further, the receiver 410 and the AI decoder 430 may be implemented by a plurality of processors. In this case, the receiver 410 and the AI decoder 430 may be implemented by a combination of dedicated processors, or may be implemented by a combination of a plurality of general-purpose processors, such as APs, CPUs, or GPUs, and S/W. Likewise, the AI upscaler 434 and the decoder 432 may be respectively implemented by different processors.

The AI data provided to the AI upscaler 434 includes pieces of information allowing the second image 135 to be AI-upscaled. Here, an upscaling target needs to correspond to downscaling in the first DNN. Accordingly, the AI data needs to include information allowing a downscaling target of the first DNN to be identified.

Specifically, examples of the information included in the AI data may include difference information between the resolution of the original image 105 and the resolution of the first image 115, and first image 115-related information.

The difference information may be represented by information about a degree of resolution conversion of the first image 115 relative to the original image 105 (for example, resolution conversion ratio information). In addition, because the degree of resolution conversion may be identified by finding out the resolution of the first image 115, which is known from the resolution of the restored second image 135, the difference information may be represented only by resolution information of the original image 105. Here, the resolution information may be represented by horizontal/vertical screen sizes or by both a ratio (for example, 16:9, 4:3, or the like) and one of a horizontal size or a vertical size. In addition, when there is preset resolution information, the resolution information may be represented in the form of an index or a flag.

Further, the first image 115-related information may include information about at least one of a bit rate of image data obtained as a result of first encoding of the first image 115, or a codec type used in the first encoding of the first image 115.

The AI upscaler 434 may determine an upscaling target of the second image 135, based on at least one of the difference information or the first image 115-related information, which is included in the AI data. The upscaling target may indicate, for example, to what resolution the second image 135 needs to be upscaled. When the upscaling target is determined, the AI upscaler 434 AI-upscales the second image 135 through the second DNN to obtain the third image 145 corresponding to the upscaling target.

Hereinafter, a process, performed by the AI upscaler 434, of AI-upscaling the second image 135 through the second DNN will be described with reference to FIG. 5.

Figure 5:
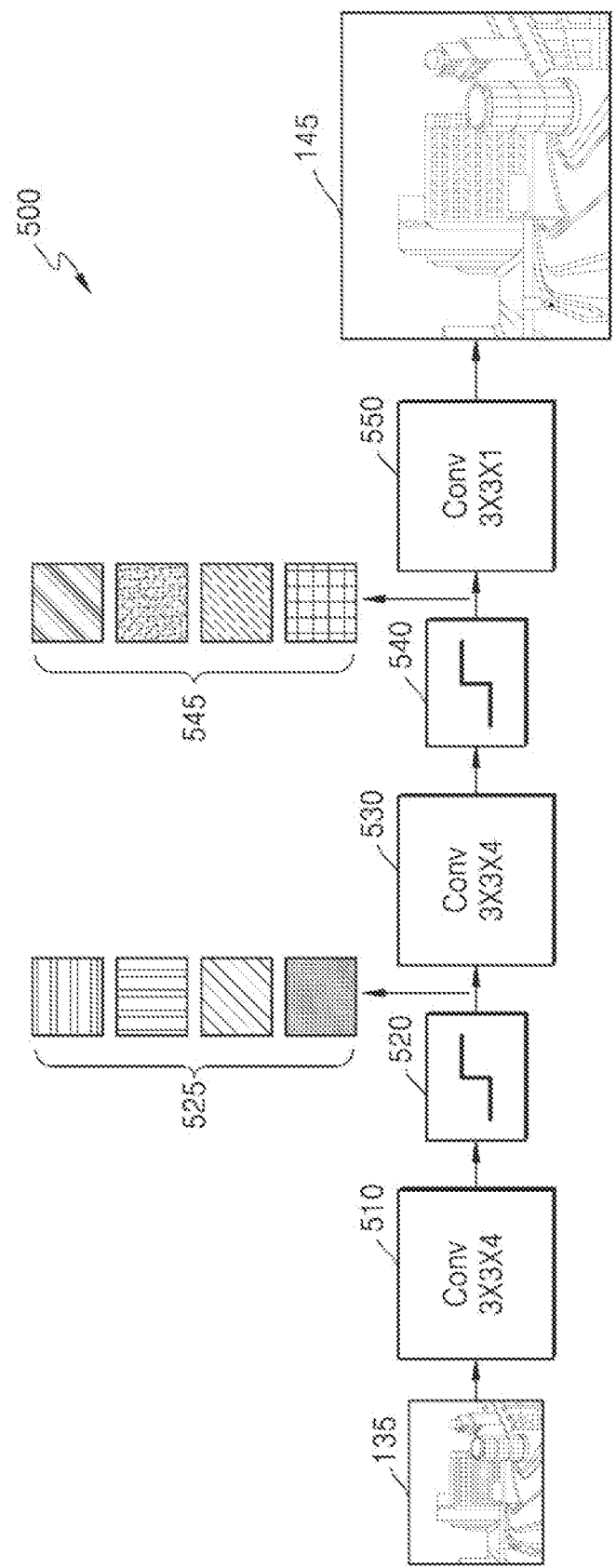
FIG. 5 is an example diagram illustrating a second DNN for AI-upscaling a second image 135.

FIG. 5 is an example diagram illustrating a second DNN 300 for AI-upscaling the second image 135.

As shown in FIG. 5, the second image 135 is input to a first convolution layer 510. "3×3×4" marked in the first convolution layer 510 shown in FIG. 5 indicates that convolution processing is performed on one input image by using four 3×3-size filter kernels. As a result of the convolution processing, four feature maps are generated by the four filter kernels. Each feature map represents unique characteristics of the second image 135. For example, each feature map may represent vertical-direction characteristics, horizontal-direction characteristics, edge characteristics, or the like of the second image 135.

According to the present disclosure, values of parameters of the second DNN, for example, values of parameters of filter kernels used in convolution layers of the second DNN, may be optimized through the joint training of the first DNN and the second DNN. As described above, the AI upscaler 434 may determine, based on the AI data, an upscale target corresponding to a downscale target of the first DNN, and may determine parameters corresponding to the determined upscale target to be the parameters of the filter kernels used in the convolution layers of the second DNN.

The feature maps output from the first convolution layer 510 are input to a first activation layer 520.

The first activation layer 520 may impart nonlinear characteristics to each of the feature maps. The first activation layer 520 may include, but is not limited to, a sigmoid function, a Tan h function, a ReLU function, or the like.

The impartment of the nonlinear characteristics by the first activation layer 520 means changing and outputting some sample values of a feature map, which is an output of the first convolution layer 510. Here, the changing is performed by applying nonlinear characteristics.

The first activation layer 520 determines whether to transfer, to a second convolution layer 530, sample values of the feature maps output from the first convolution layer 510. For example, among the sample values of the feature maps, some sample values are activated by the first activation layer 520 and transferred to the second convolution layer 530, and some sample values are deactivated by the first activation layer 520 and are not transferred to the second convolution layer 530. The unique characteristics of the second image 135, which are represented by the feature maps, are emphasized by the first activation layer 520.

Feature maps 525 output from the first activation layer 520 are input to the second convolution layer 530.

"3×3×4" marked in the second convolution layer 530 indicates that convolution processing is performed on the input feature maps 525 by using four 3×3-size filter kernels. An output of the second convolution layer 530 is input to a second activation layer 540. The second activation layer 540 may impart nonlinear characteristics to input data.

Feature maps 345 output from the second activation layer 540 are input to a third convolution layer 550. "3×3×1" marked in the third convolution layer 550 shown in FIG. 5 indicates that, by using one 3×3-size filter kernel, convolution processing is performed to make one output image. The third convolution layer 550 is a layer for outputting a final image and generates one output by using one filter kernel. According to an example of the present disclosure, the third convolution layer 550 may output the third image 145 through a convolution operation result.

There may be a plurality of pieces of DNN setting information representing the number of filter kernels, parameters of filter kernels, and the like of each of the first convolution layer 510, the second convolution layer 530, and the third convolution layer 550 in the second DNN 500, and the plurality of pieces of DNN setting information need to be associated with the plurality of pieces of DNN setting information of the first DNN. The association between the plurality of pieces of DNN setting information of the second DNN and the plurality of pieces of DNN setting information of the first DNN may be implemented through the joint training of the first DNN and the second DNN.

Although FIG. 5 illustrates that the second DNN 500 includes the three convolution layers 510, 530, and 550 and the two activation layers 520 and 540, this is merely an example, and the number of convolution layers and the number of activation layers may be variously changed according to implementation examples. In addition, according to implementation examples, the second DNN 500 may be implemented by an RNN. This means changing a CNN structure of the second DNN 500 according to an example of the present disclosure into an RNN structure.

In an embodiment of the present disclosure, the AI upscaler 434 may include at least one ALU for the above-described convolution operation and the above-described operation of the activation layer. The ALU may be implemented by a processor.

Hereinafter, a method, performed by the AI upscaler 434, of AI-upscaling the second image 135 according to an upscaling target will be described.

In an embodiment of the present disclosure, the AI upscaler 434 may store a plurality of pieces of DNN setting information capable of being set in the second DNN.

Here, the pieces of DNN setting information may include information about at least one of the number of convolution layers included in the second DNN, the number of filter kernels for each convolution layer, or parameters of each filter kernel. The plurality of pieces of DNN setting information may respectively correspond to various upscaling targets, and the second DNN may be operated based on a piece of DNN setting information corresponding to a particular upscaling target. According to a piece of DNN setting information, the second DNN may have a different structure. For example, the second DNN may include three convolution layers according to a certain piece of DNN setting information, and the second DNN may include four convolution layers according to another piece of DNN setting information.

In an embodiment of the present disclosure, the piece of DNN setting information may include only a parameter of a filter kernel used in the second DNN. In this case, the structure of the second DNN is not changed, and the parameter of the filter kernel therein may vary according to the piece of DNN setting information.

The AI upscaler 434 may obtain a piece of DNN setting information for AI-upscaling the second image 135, from among the plurality of pieces of DNN setting information. Each of the plurality of pieces of DNN setting information used here is information for obtaining the third image 145 with a preset resolution and/or preset image quality, and is obtained by joint training with the first DNN.

For example, among the plurality of pieces of DNN setting information, one piece of DNN setting information may include pieces of information for obtaining the third image 145 with a resolution twice higher than the resolution of the second image 135, for example, pieces of information for obtaining the third image 145 with a 4K (4096*2160) resolution twice higher than a 2K (2048*1080) resolution of the second image 135, and another piece of DNN setting information may include pieces of information for obtaining the third image 145 with a resolution four times higher than the resolution of the second image 135, for example, pieces of information for obtaining the third image 145 with an 8K (8192*4320) resolution four times higher than the 2K (2048*1080) resolution of the second image 135.

Each of the plurality of pieces of DNN setting information is made in association with the DNN setting information of the first DNN of the AI downscaling apparatus 200, and the AI upscaler 434 obtains one piece of DNN setting information from among the plurality of pieces of DNN setting information according to an enlargement ratio corresponding to a reduction ratio of the DNN setting information of the first DNN. To this end, the AI upscaler 434 needs to identify information of the first DNN. For the AI upscaler 434 to identify the information of the first DNN, the AI upscaling apparatus 400 according to an embodiment of the present disclosure receives, from the AI downscaling apparatus 200, the AI data including the information of the first DNN.

In other words, by using pieces of information received from the AI downscaling device 200, the AI upscaler 434 may identify information targeted by the piece of DNN setting information of the first DNN, which is used to obtain the first image 115, and may obtain a piece of DNN setting information of the second DNN trained jointly therewith.

When the piece of DNN setting information for AI-upscaling the second image 135 from among the plurality of pieces of DNN setting information is obtained, input data may be processed based on the second DNN that operates according to the obtained piece of DNN setting information.

For example, when one piece of DNN setting information is obtained, the number of filter kernels and parameters of filter kernels, in each of the first convolution layer 510, the second convolution layer 530, and the third convolution layer 550 of the second DNN 500 shown in FIG. 5, may be set to values included in the obtained piece of DNN setting information.

The AI upscaler 434 may obtain the piece of DNN setting information for AI-upscaling the second image 135 from among the plurality of pieces of DNN setting information, based on information included in the AI data, and the AI data used to obtain the piece of DNN setting information will be described in detail.

In an embodiment of the present disclosure, the AI upscaler 434 may obtain the piece of DNN setting information for AI-upscaling the second image 135 from among the plurality of pieces of DNN setting information, based on the difference information included in the AI data. For example, based on the difference information, when the resolution (for example, 4K (4096*2160)) of the original image 105 is identified to be twice higher than the resolution (for example, 2K (2048*1080)) of the first image 115, the AI upscaler 434 may obtain the pieces of DNN setting information allowing the resolution of the second image 135 to be increased twice.

In another embodiment of the present disclosure, the AI upscaler 434 may obtain the piece of DNN setting information for AI-upscaling the second image 135 from among the plurality of pieces of DNN setting information, based on the first image 115-related information included in the AI data. The AI upscaler 434 may determine, in advance, a mapping relation between pieces of image-related information and pieces of DNN setting information and may obtain a piece of DNN setting information mapped to the first image 115-related information.

As described with reference to FIGS. 1 to 5, when restoration to a high-resolution image (for example, the third image 145 of FIG. 1) is performed by downscaling the original image 105 to a low-resolution image (for example, the first image 115 of FIG. 1) and upscaling the low-resolution image (for example, the second image 135 of FIG. 1) again, because the loss of information for configuring pixels included in the original image is unavoidable, information loss unavoidably occurs during the restoration to the high-resolution image. That is, due thereto, the restored high-resolution image is different from the original image and has artifacts generated therein. The artifacts may include, but are not limited to, aliasing artifacts and jagging artifacts.

The aliasing artifacts refer to a phenomenon that patterns similar to wave patterns are caused, and the jagging artifacts refer to a phenomenon that lines or edge regions are bent like stairs. In addition, the aliasing artifacts occur mainly in high frequency ranges in which a difference in pixel value sharply changes, and appear as a flickering phenomenon by which a pattern (or texture) in the same object included in a frame image trembles or flickers instead of being maintained constant along with frames.

Because these artifacts have significant influence on the image quality of images, the artifacts, together with improving the sharpness of images, are a crucial factor in improving image quality.

To remove the artifacts in streaming an image such as a video, use of motion information between image frames is a representative method. For example, an optimum state of a frame image, which is currently generated or is to be generated in the future, is predicted by using motion information of a plurality of image frames. That is, the artifacts are removed by using motion estimation and motion compensation. However, a system for removing artifacts by using motion estimation and motion compensation requires a separate calculation device for processing the motion estimation and the motion compensation.

In addition, to use the motion estimation and the motion compensation, information about a previous frame image or a next frame image is required in addition to a current frame image, and an additional memory for storing a plurality of pieces of frame image information is required.

Further, additional traffic occurs due to an additional calculation unit and memory access, and due thereto, a system delay occurs.

Accordingly, there is a need for an AI upscaling apparatus and an AI downscaling apparatus, which are capable of removing artifacts without additional hardware, a change in existing hardware, and additional costs.

The AI downscaling apparatus and the AI upscaling apparatus, according to an embodiment of the present disclosure, may remove artifacts caused in the process of AI-downscaling and AI-upscaling images, without additional devices (hardware) added to existing AI downscaling apparatuses and existing AI upscaling apparatuses, changes in existing hardware, and additional costs.

Hereinafter, an AI downscaling apparatus and an AI upscaling apparatus, according to an embodiment of the present disclosure, will be described in detail with reference to the accompanying drawings.

FIG. 6 is a flowchart illustrating a method of training a first DNN and a second DNN, according to an embodiment of the present disclosure.

During a training process of the first DNN, pieces of setting information of the second DNN (for example, second parameters of the second DNN) are fixed, and at least one of pieces of setting information of the first DNN (for example, first parameters of the first DNN) may be updated. In addition, during a training process of the second DNN, the pieces of setting information of the first DNN are fixed, and at least one of the pieces of setting information of the second DNN may be updated.

Referring to FIG. 6, a training apparatus according to an embodiment of the present disclosure may generate one or more translation images by applying movement or translation to an original image (S610).

Here, the original image may include at least one frame image constituting a video. In addition, the translation may be determined according to a resolution that is intended to be obtained through AI downscaling. For example, when it is intended to reduce a resolution to 1/n times the resolution, one pixel per n pixels in the original image is sampled, and one image with no pixel movement from the original image, and n−1 translation images with pixel movement therefrom may be generated. Accordingly, one original image (an image with no pixel movement), which results from applying no translation to the original image, and n−1 translation images, which result from applying n−1 translations to the original image, may be obtained.

For example, in the case of n=4, four images, in total, are generated, the four images including the original image with no pixel movement and three translation images (first, second, and third translation images) obtained by moving the original image by as much as one pixel in right, left, and diagonal directions, respectively. The training apparatus may perform initial setting on DNN setting information of the first DNN and the second DNN, before performing training. The first DNN and the second DNN may each be operated according to preset DNN setting information, and the DNN setting information may include information about at least one of the number of convolution layers in the first DNN and the second DNN, the number of filter kernels for each convolution layer, a filter kernel size for each convolution layer, or parameters (first parameters and second parameters) of each filter kernel.

The training apparatus may obtain a plurality of low-resolution images by performing an operation with the first parameters of the first DNN on each of the original image with no pixel movement and the one or more translation images (S620).

The training apparatus may set values of the first parameters of the first DNN according to the initially set DNN setting information. As described with reference to FIG. 3, the first DNN may perform a convolution operation with the set first parameters, an operation of an activation layer, and the like on each of the original image with no pixel movement and the one or more translation images. Accordingly, the first DNN outputs the plurality of low-resolution images obtained by AI-downscaling the original image with no pixel movement and the one or more translation images.

The training apparatus may obtain a plurality of high-resolution images by performing an operation with the second parameters of the second DNN on each of the plurality of low-resolution images obtained from the first DNN.

The training apparatus may set values of the second parameters of the second DNN according to the initially set DNN setting information. As described with reference to FIG. 5, the second DNN may perform a convolution operation with the set second parameters, an operation of an activation layer, and the like on each of the plurality of low-resolution images. Accordingly, the second DNN outputs the plurality of high-resolution images obtained by AI-upscaling the plurality of low-resolution images.

The training apparatus may generate a plurality of restored images (or result images) by applying reverse movement or retranslation to the plurality of high-resolution images (S640). The restored images (or result images) may include an original restored image (first restored image), which is a restored image for the original image with no pixel movement, and translation restored images (second restored images), which are restored images for the one or more translation images.

Here, the retranslation may be determined based on the translation applied in operation S610. For example, the retranslation may be a movement in the reverse direction with respect to the translation. When a movement to the right is made in the translation, a movement to the left may be made in the retranslation, and when a movement to the left is made in the translation, a movement to the right may be made in the retranslation. In addition, when an upward movement is made in the translation, a downward movement may be made in the retranslation, and when a downward movement is made in the translation, an upward movement may be made in the retranslation. However, the present disclosure is not limited thereto.

The training apparatus may obtain first difference information (content loss information (Lc)) between the original image and each of the restored images (the original restored image and the translation restored images), and second difference information (ensemble loss information (Le)) between the plurality of restored images (the original restored image, which is a restored image for the original image with no pixel movement, and the translation restored images, which are restored images for the one or more translation images) (S650).

The training apparatus may update at least one of the first parameters of the first DNN or the second parameters of the second DNN, based on the first difference information and the second difference information (S660).

For example, based on the first difference information and the second difference information, the training apparatus may determine final loss information and may update at least one of the first parameters or the second parameters toward reducing or minimizing the final loss information.

During the training process of the first DNN, the second parameters of the second DNN are fixed, and at least one of the first parameters of the first DNN may be updated. In addition, during the training process of the second DNN, the first parameters of the first DNN are fixed, and at least one of the second parameters of the second DNN may be updated. Alternatively, the first parameters of the first DNN and the second parameters of the second DNN may be updated all together.

The method of training the first DNN and the second DNN, shown in FIG. 6, according to an embodiment of the present disclosure, will be described below in more detail with reference to FIGS. 7 and 8.

FIGS. 7A to 7E are diagrams for reference to describe a method of training a first DNN for AI downscaling and a second DNN for AI upscaling, according to an embodiment of the present disclosure.

A first DNN 730 in FIGS. 7A to 7E may correspond to the first DNN 300 in FIG. 3, and a second DNN 750 in FIGS. 7A to 7E may correspond to the second DNN 500 in FIG. 5.

During a training process of the first DNN 730, pieces of setting information (second parameters) of the second DNN 750 are fixed, and at least one of pieces of setting information (first parameters) of the first DNN 730 are updated. During a training process of the second DNN 750, the pieces of setting information (the first parameters) of the first DNN 730 are fixed, and at least one of the pieces of setting information (the second parameters) of the second DNN 750 are updated. Alternatively, the pieces of setting information (the first parameters) of the first DNN 730 and the pieces of setting information (the second parameters) of the second DNN 750 are not fixed, and the pieces of setting information (the first parameters) of the first DNN 730 and the pieces of setting information (the second parameters) of the second DNN 750 may be updated all together toward reducing or minimizing the final loss information. However, the present disclosure is not limited thereto.

As described above with reference to FIG. 1, the original image AI-downscaled through the AI downscaling process, according to an embodiment of the present disclosure, is restored to the third image 145 through the AI upscaling process, and an association between the AI downscaling process and the AI upscaling process is needed to maintain the similarity between the third image 145 obtained as a result of the AI upscaling and the original image 105. That is, information lost during the AI downscaling process needs to be restored during the AI upscaling process, and to this end, the joint training of the first DNN 730 and the second DNN 750 is required.

Figure 7A:
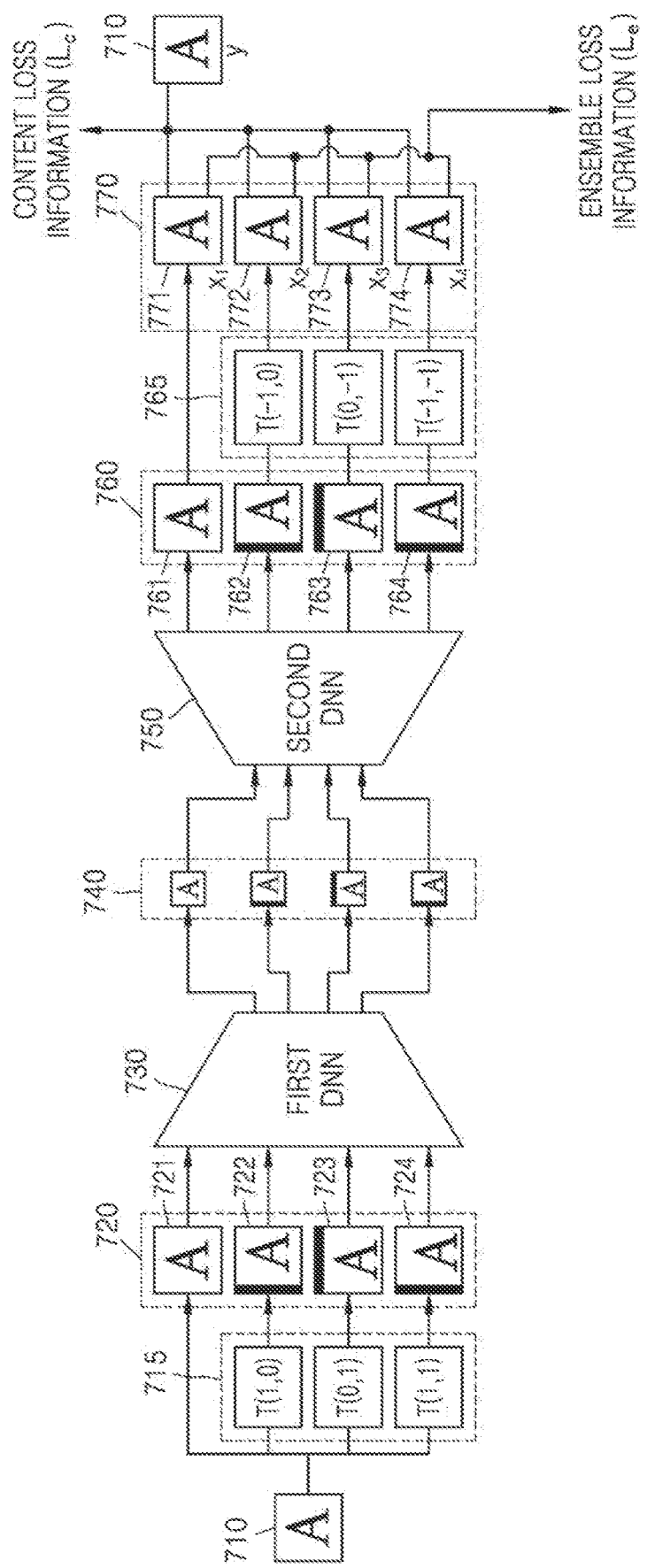

In FIG. 7A, an original training image 710 is an image targeted by AI downscaling. The original training image 710 may include a moving image or a video, which includes a plurality of frames. A plurality of images 720 including an original image with no pixel movement and one or more translation images may be generated by applying movement or translation 715 to the original training image 710. Here, the number of images 720 may be determined according to a resolution that is intended to be obtained through AI downscaling. In FIG. 7A, an example, in which a resolution is intended to be reduced to ¼ times the resolution through AI downscaling, will be described.

When a resolution is intended to be reduced to ¼ times the resolution through AI downscaling, four images 720 may be generated. That is, the four images 720 may include one original training image (an image with no pixel movement) 721 and three translation images 722, 723, and 724. For example, the three translation images 722, 723, and 724 may include an image (first translation image 722) obtained by moving pixels included in the original training image 710 to the right by as much as one pixel, an image (second translation image 723) obtained by moving the pixels included in the original training image 710 downward by as much as one pixel, and an image (third translation image 724) obtained by moving the pixels included in the original training image 710 to the right by as much as one pixel and downward by as much as one pixel.

The original training image 721 and the first to third translation images 722, 723, and 724 may be input to the first DNN 730. When the original training image 721 and the first to third translation images 722, 723, and 724 are input to the first DNN 730, the first DNN 730 may output four low-resolution images 740 obtained by AI-downscaling the original training image 721 and the first to third translation images 722, 723, and 724.

For the joint training of the first DNN 730 and the second DNN 750, the four low-resolution images 740 obtained from the first DNN 730 may be input to the second DNN 750. When the four low-resolution images 740 obtained from the first DNN 730 are input to the second DNN 750, the second DNN 750 may output four high-resolution images 760 obtained by AI-upscaling the four low-resolution images 740.

Four restored images (or result images) 770 may be generated by applying reverse movement or retranslation 765 to the four high-resolution images 760 obtained from the second DNN. Here, the retranslation 765 may be a movement in the reverse direction with respect to the translation 715 applied to the original training image. For example, a first high-resolution image 761 corresponding to the original training image 721 may become a first restored image 771, as it is. In addition, a second high-resolution image 762 corresponding to the first translation image 722 may be retranslated to a second restored image 772, which is obtained by moving pixels included in the second high-resolution image 762 to the left by as much as one pixel. A third high-resolution image 763 corresponding to the second translation image 723 may be retranslated to a third restored image 773, which is obtained by moving pixels included in the third high-resolution image 763 upward by as much as one pixel. A fourth high-resolution image 764 corresponding to the third translation image 724 may be retranslated to a fourth restored image 774, which is obtained by moving pixels included in the fourth high-resolution image 764 to the left by as much as one pixel and upward by as much as one pixel. Here, the first restored image 771 is an original restored image, which is a restored image for the original image with no pixel movement, and the second, third, and fourth restored images 772, 773, and 774 are translation restored images, which are restored images for the one or more translation images. As the training proceeds, the content loss information (Lc) and the ensemble loss information (Le) may be determined. The content loss information (Lc) may be determined based on difference information between the original training image 710 and each of the plurality of restored images 770. The content loss information (Lc) is information indicating a degree of similarity of the plurality of restored images 770 with respect to the original training image 710. As the content loss information (Lc) decreases, the plurality of restored images 770 are more similar to the original training image 710.

The content loss information (Lc) may be represented by the following Equation 1.

$$L_c = MSE(x_1, y) + \ldots + MSE(x_n, y) \qquad \text{[Equation 1]}$$

The content loss information (Lc) may be represented by a value obtained by summing up mean square errors between the original training image and each of the plurality of restored images. In Equation 1, $x_1, x_2, \ldots,$ and $x_n$ respectively represent the plurality of restored images, and y represents the original training image.

For example, in the case of FIG. 7A, the content loss information (Lc) may be determined to be a value obtained by summing up a first mean square error between the first restored image 771 ($x_1$) and the original training image 710 (y), a second mean square error between the second restored image 772 ($x_2$) and the original training image 710 (y), a third mean square error between the third restored image 773 ($x_3$) and the original training image 710 (y), and a fourth mean square error between the fourth restored image 774 ($x_4$) and the original training image 710 (y).

In addition, the ensemble loss information (Le) may be determined based on difference information between the plurality of restored images 770. The ensemble loss information (Le) will be described in detail with reference to FIG. 8.

Figure 8:
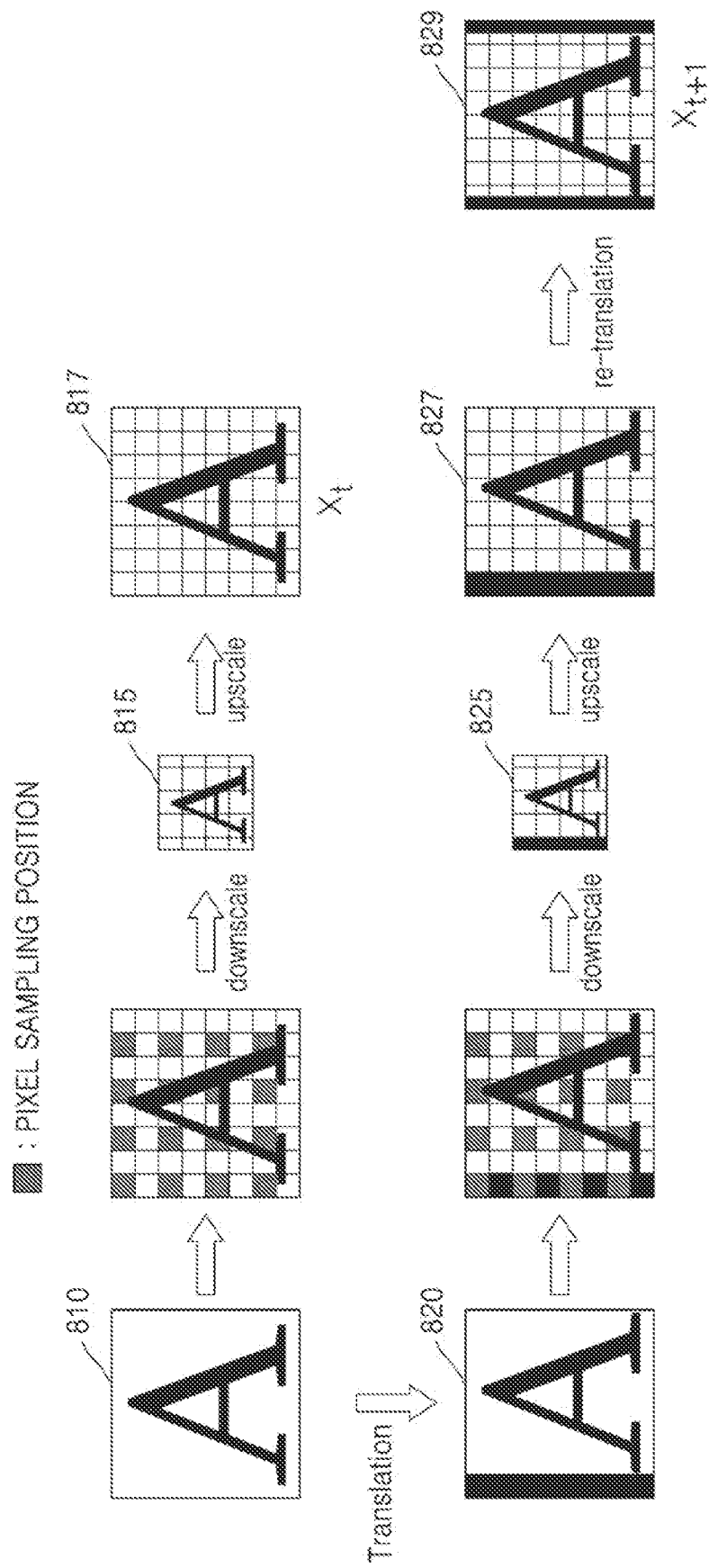
FIG. 8 is a diagram for reference to illustrate ensemble loss information, according to an embodiment of the present disclosure.

FIG. 8 is a diagram for reference to describe ensemble loss information according to an embodiment of the present disclosure.

Referring to FIG. 8, pixels included in an original image 810 are moved to the right by as much as one pixel, thereby generating a translation image 820. Here, the generating of the translation image 820 is similar to, when the original image 810 is assumed to be a t frame image, generating a t+1 frame image. That is, it may be considered that the original image 810 corresponds to the t frame image and the translation image 820 corresponds to the t+1 frame image.

To reduce the resolution of each of the original image 810 and the translation image 820 to ¼ times the resolution thereof, pixel sampling may be performed. The original image 810 is downscaled to a first low-resolution image 815 by performing the pixel sampling thereon, and the translation image 820 is downscaled to a second low-resolution image 825 by performing pixel sampling thereon. In addition, the first low-resolution image 815 is 4 times upscaled to a first high-resolution image 817, and the second low-resolution image 825 is 4 times upscaled to a second high-resolution image 827.

Further, pixels included in the second high-resolution image 827 are moved to the left by as much as one pixel, thereby generating a restored image 829. Here, the generating of the restored image 829 by moving the pixels is similar to a motion compensation process in which the t+1 frame image is fitted to the t frame image. However, the first high-resolution image 817 is different from the restored image 829, and thus, artifacts are caused.

Referring to FIG. 8, when the original image 810 and the translation image 820 are downscaled, because there is a difference in pixel information used for pixel sampling, there is a difference in lost information, and thus, even though each image is restored by upscaling and retranslation, each piece of restored image information is different. Accordingly, to remove artifacts, the restored images (that is, 817 and 829) need to be identical to each other, and the ensemble loss information (Le), which is determined based on the difference information between the plurality of restored images, needs to be reduced. That is, the ensemble loss information (Le) is information indicating a degree of similarity of the plurality of restored images with respect to each other, and as the ensemble loss information decreases, the restored images become more similar to each other, and the artifacts decrease.

Referring again to FIG. 7A, the ensemble loss information may be represented by the following Equation 2.

$$L_e = MSE(x_1, x_2) + MSE(x_1, x_3) + \ldots + MSE(x_{n-1}, x_n)$$ [Equation 2]

The ensemble loss information (Le) may be represented by a value obtained by summing up mean square errors between the plurality of restored images. In Equation 2, $x_1$, $x_2, \ldots,$ and $x_n$ respectively represent the plurality of restored images.

For example, in the case of FIG. 7A, the ensemble loss information (Le) may be determined to be a value obtained by summing up a mean square error between the first restored image 771 ($x_1$) and the second restored image 772 ($x_2$), a mean square error between the first restored image 771 ($x_1$) and the third restored image 773 ($x_3$), a mean square error between the first restored image 771 ($x_1$) and the fourth restored image 774 ($x_4$), a mean square error between the second restored image 772 ($x_2$) and the third restored image 773 ($x_3$), a mean square error between the second restored image 772 ($x_2$) and the fourth restored image 774 ($x_4$), and a mean square error between the third restored image 773 ($x_3$) and the fourth restored image 774 ($x_4$).

Figure 7B:
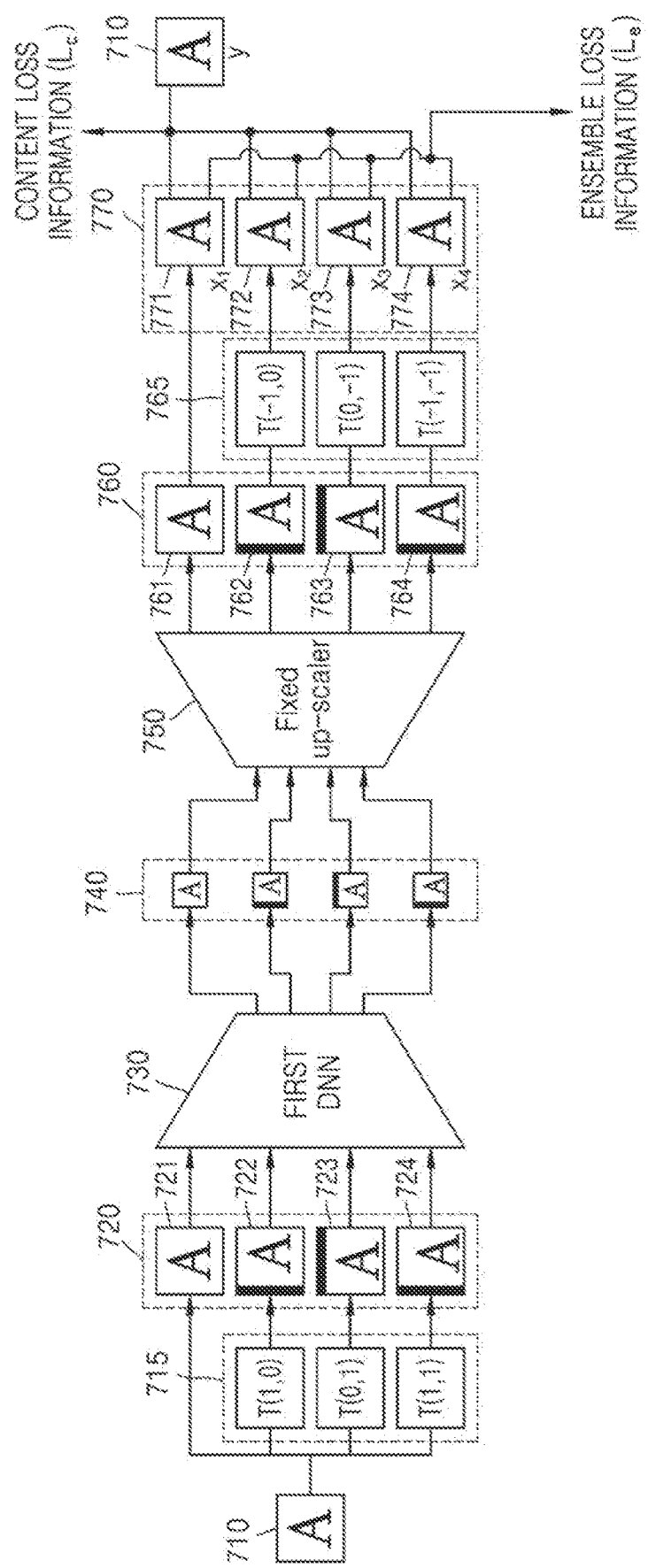

Referring to FIG. 7A, the first DNN 730 and the second DNN 750 may update parameters thereof toward reducing or minimizing the final loss information that is determined based on the content loss information (Lc) and the ensemble loss information (Le). In addition, as shown in FIG. 7B, the second parameters of the second DNN 750 are fixed when the first parameters of the first DNN 730 are trained, and thus, the second DNN 750 may operate as a fixed upscaler. For example, the plurality of translation images 722, 723, and 724 are generated by applying the translation 715 to the original training image 710, and one original training image (an image with no pixel movement) 721 and the plurality of translation images 722, 723, and 724 are input to the first DNN 730, thereby outputting the AI-downscaled low-resolution images 740. The output low-resolution images 740 are input to the second DNN 750 in which the second parameters are fixed, thereby outputting the AI-upscaled high-resolution images 760. The restored images 770 are generated by applying the retranslation 765 to the AI-upscaled high-resolution images 760. The content loss information (Lc) and the ensemble loss information (Le) may be determined based on the original training image 710 and the restored images 770, and the first parameters of the first DNN 730 may be updated toward minimizing the final loss information determined based on the content loss information (Lc) and the ensemble loss information (Le).

Figure 7C:
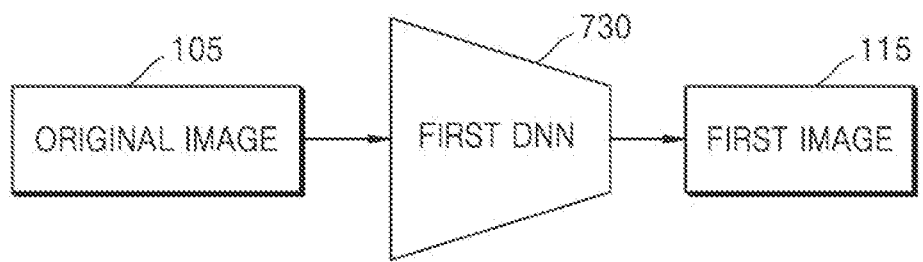

When the training of the first DNN 730 is completed, final values of the first parameters of the first DNN 730 are determined as shown in FIG. 7C, and when the original image 105 is input to the training-completed first DNN 730, a low-resolution image (that is, the first image 115), which is AI-downscaled from the original image 105, may be output.

In addition, as shown in FIG. 7D, the first parameters of the first DNN 730 are fixed when the second parameters of the second DNN 750 are trained, and thus, the first DNN 730 may operate as a fixed downscaler. For example, the plurality of translation images 722, 723, and 724 are generated by applying the translation 715 to the original training image 710, one original training image 721 (an image with no pixel movement) and the plurality of translation images 722, 723, and 724 are input to the first DNN 730 in which the first parameters are fixed, thereby outputting the AI-downscaled low-resolution images 740. The output low-resolution images 740 are input to the second DNN 750, thereby outputting the AI-upscaled high-resolution images 760. The restored images 770 are generated by applying the retranslation 765 to the AI-upscaled high-resolution images 760. The content loss information (Lc) and the ensemble loss information (Le) may be determined based on the original training image 710 and the restored images 770, and the second parameters of the second DNN 750 may be updated toward minimizing the final loss information that is determined based on the content loss information (Lc) and the ensemble loss information (Le).

Figure 7E:
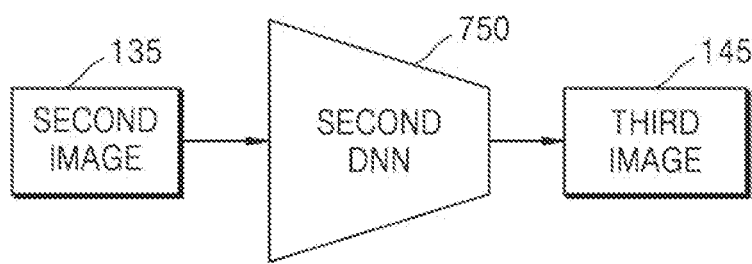

When the training of the second DNN 750 is completed, final values of the second parameters of the second DNN 750 are determined as shown in FIG. 7E, and when the second image 135 is input to the training-completed second DNN 750, a high-resolution image (that is, the third image 145), which is AI-upscaled from the second image 135, may be output.

For convenience of description, descriptions regarding FIGS. 7A, 7B, 7D, and 8 have been made by taking, as an example, the training method of the first DNN 730 and the second DNN 750 when the first DNN 730 reduces a resolution to ¼ times the resolution and the second DNN 750 increases a resolution to 4 times the resolution. However, the present disclosure is not limited thereto, according to a degree of reducing a resolution by the first DNN 730 or a degree of increasing a resolution by the second DNN 750, the number of translation images, the number of restored images, the content loss information, the ensemble loss information, and the like may vary.

Figure 9:
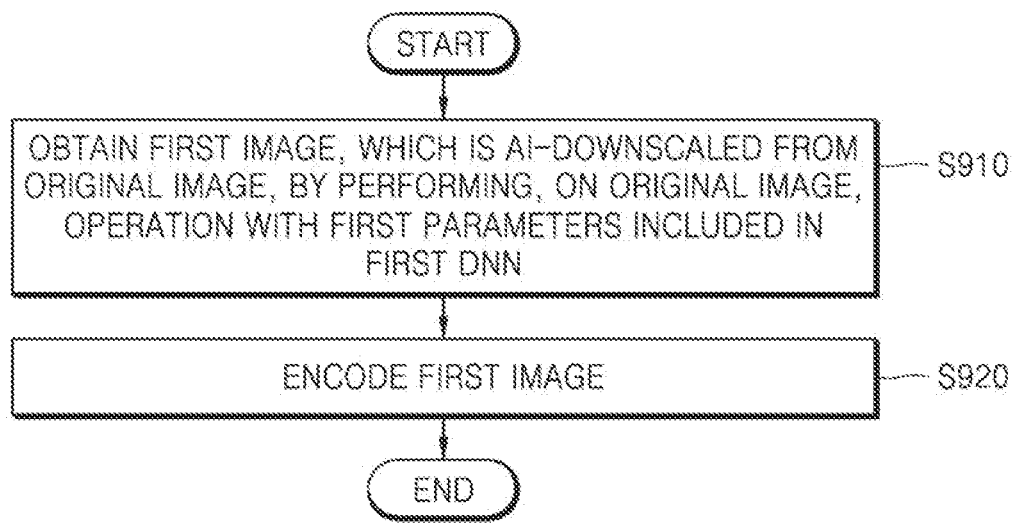
FIG. 9 is a flowchart illustrating an operating method of an AI downscaling apparatus, according to an embodiment of the present disclosure.

FIG. 9 is a flowchart illustrating an operating method of an AI downscaling apparatus, according to an embodiment of the present disclosure.

Referring to FIG. 9, the AI downscaling apparatus 200 according to an embodiment of the present disclosure obtains a first image, which is AI-downscaled from an original image, by performing, on the original image, an operation with first parameters included in a first DNN (S910).

The first DNN according to an embodiment of the present disclosure is a network for AI-downscaling an image, corresponds to a second DNN for AI-upscaling an image, and may be a network that is trained jointly with the second DNN. As the first DNN and the second DNN are jointly trained, the first parameters included in the first DNN are determined to be values associated with second parameters included in the second DNN.

For example, the first DNN according to an embodiment of the present disclosure is trained jointly with the second DNN as described with reference to FIGS. 7A to 7E, when the first parameters of the first DNN are updated during the process of training the first DNN and the second DNN, a plurality of low-resolution images output from the first DNN vary, and when the plurality of low-resolution images input to the second DNN vary, a plurality of high-resolution images output from the second DNN also vary and restored images also vary. Accordingly, loss information (for example, the content loss information (Lc) and the ensemble loss information (Le)) for the training is newly determined. Accordingly, the second parameters of the second DNN are updated toward minimizing the newly determined loss information. Therefore, values of the first parameters of the first DNN having been trained are associated with values of the second parameters of the second DNN having been trained.

In addition, because the first parameters of the first DNN and the second parameters of the second DNN are updated toward minimizing the ensemble loss information during the training process, a restored image, which is AI-downscaled by using the training-completed first DNN and subsequently AI-upscaled by using the training-completed second DNN, may be an artifact-removed image.

The AI downscaling apparatus 200 may encode the obtained first image (S920).

The AI downscaling apparatus 200 may encode the first image and transmit the encoded first image to an AI upscaling apparatus.

Figure 10:
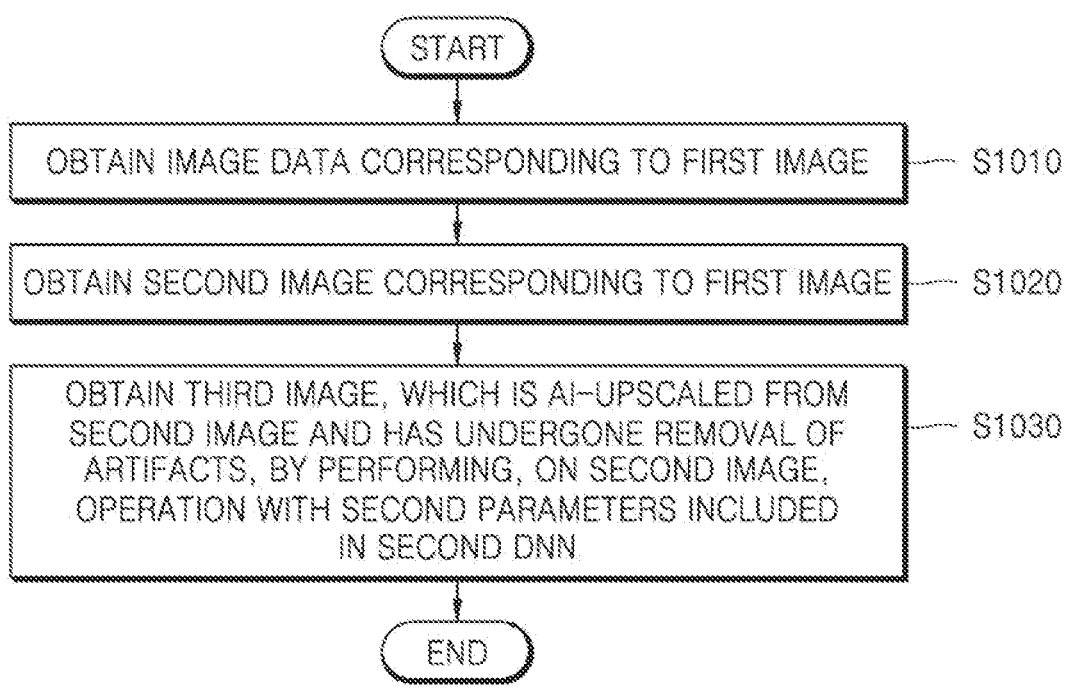
FIG. 10 is a flowchart illustrating an operating method of an AI upscaling apparatus, according to an embodiment of the present disclosure.

FIG. 10 is a flowchart illustrating an operating method of an AI upscaling apparatus, according to an embodiment of the present disclosure.

Referring to FIG. 10, the AI upscaling apparatus 400 according to an embodiment of the present disclosure may obtain image data corresponding to the first image (S1010).

Here, the first image may be an image AI-downscaled from an original image by using a first DNN, and the image data may be generated as a result of encoding the first image. The AI upscaling apparatus 400 may receive the image data in a bitstream format.

The AI upscaling apparatus 400 may restore a second image corresponding to the first image, based on the image data (S1020).

The AI upscaling apparatus 400 may receive the image data and AI data, may obtain residual data of the second image by using the image data, and may restore the second image by using predicted data and the residual data.

The AI upscaling apparatus 400 may input the restored second image to the second DNN and perform an operation with second parameters, which are included in the second DNN, on the second image input to the second DNN, thereby obtaining a third image that is AI-upscaled from the second image and has undergone removal of artifacts.

The second DNN according to an embodiment of the present disclosure is a network for AI-upscaling an image, corresponds to the first DNN for AI-downscaling an image, and is a network that is trained jointly with the first DNN. As the first DNN and the second DNN are jointly trained, the second parameters included in the second DNN are determined to be values associated with first parameters included in the first DNN.

For example, the first DNN according to an embodiment of the present disclosure is trained jointly with the second DNN as described with reference to FIGS. 7A to 7E, when the first parameters of the first DNN are updated during the process of training the first DNN and the second DNN, the plurality of low-resolution images output from the first DNN vary, and when the plurality of low-resolution images input to the second DNN vary, the plurality of high-resolution images output from the second DNN also vary and restored images also vary. Accordingly, loss information (for example, the content loss information (Lc) and the ensemble loss information (Le)) for the training is newly determined. Accordingly, the second parameters of the second DNN are updated toward minimizing the newly determined loss information. Therefore, values of the first parameters of the first DNN having been trained are associated with values of the second parameters of the second DNN having been trained.

In addition, because the first parameters of the first DNN and the second parameters of the second DNN are updated toward minimizing the ensemble loss information during the training process, an image, which is AI-downscaled by using the training-completed first DNN and subsequently AI-upscaled by using the training-completed second DNN, may be an artifact-removed image.

Figure 11:
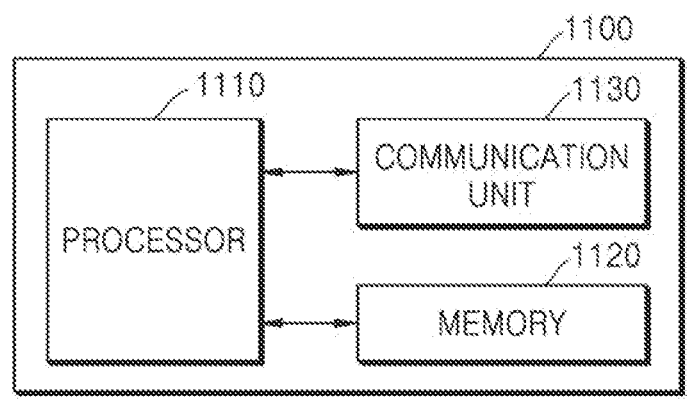
FIG. 11 is a block diagram illustrating a configuration of an AI downscaling apparatus, according to an embodiment of the present disclosure.

FIG. 11 is a block diagram illustrating a configuration of an AI downscaling apparatus, according to an embodiment of the present disclosure.

Referring to FIG. 11, an AI downscaling apparatus 1100 according to an embodiment of the present disclosure may include a processor 1110, a memory 1120, and a communication unit 1130.

The processor 1110 according to an embodiment of the present disclosure may take overall control of the AI downscaling apparatus 1100. The processor 1110 according to an embodiment of the present disclosure may execute one or more programs stored in the memory 1120.

The memory 1120 according to an embodiment of the present disclosure may store various data, programs, or applications for driving and controlling the AI downscaling apparatus 1100. A program stored in the memory 1120 may include one or more instructions. A program (one or more instructions) or application stored in the memory 1120 may be executed by the processor 1110.

The processor 1110 according to an embodiment of the present disclosure may perform at least one of operations of the AI encoder 210 and the data processing unit 232, which are described with reference to FIG. 2, or operations of the AI downscaling apparatus 200 described with reference to FIG. 9.

For example, the processor 1110 may obtain a first image, which is AI-downscaled from an original image, by performing, on the original image, an operation with the first parameters included in the first DNN 300, and may encode the first image.

The communication unit 1130 according to an embodiment of the present disclosure may correspond to the communication unit 234 of FIG. 2. Therefore, the same descriptions given with reference to FIG. 2 are omitted regarding FIG. 11.

The communication unit 1130 according to an embodiment of the present disclosure may transmit data or signals to and receive data or signals from an external apparatus (for example, an AI upscaling apparatus) by control by the processor 1110.

The communication unit 1130 may transmit AI-encoded data to an AI upscaling apparatus though a network.

Figure 12:
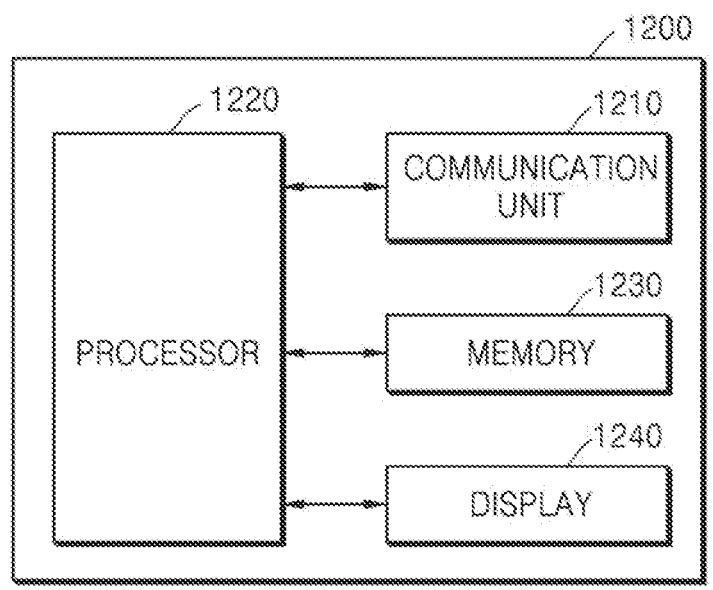
FIG. 12 is a block diagram illustrating a configuration of an AI upscaling apparatus, according to an embodiment of the present disclosure.

FIG. 12 is a block diagram illustrating a configuration of an AI upscaling apparatus, according to an embodiment of the present disclosure.

Referring to FIG. 12, an AI upscaling apparatus 1200 according to an embodiment of the present disclosure may include a communication unit 1210, a processor 1220, a memory 1230, and a display 1240.

The communication unit 1210 according to an embodiment of the present disclosure may correspond to the communication unit 412 of FIG. 4. Therefore, the same descriptions given with reference to FIG. 4 are omitted regarding FIG. 12.

The communication unit 1210 according to an embodiment of the present disclosure may transmit data or signals to and receive data or signals from an external apparatus (for example, an AI downscaling apparatus) by control by the processor 1220. The communication unit 1210 may receive AI-encoded data from an AI downscaling apparatus through a network.

The communication unit 1210 may include one of a wireless local area network (LAN) (for example, Wi-Fi) adaptor, a Bluetooth adaptor, and a wired Ethernet adaptor, in correspondence with the capability and structure of the AI upscaling apparatus 1200. In addition, the communication unit 1210 may include a combination of a wireless LAN adaptor, a Bluetooth adaptor, and a wired Ethernet adaptor.

The processor 1220 according to an embodiment of the present disclosure may take overall control of the AI upscaling apparatus 1200. The processor 1220 according to an embodiment of the present disclosure may execute one or more programs stored in the memory 1230.

The memory 1230 according to an embodiment of the present disclosure may store various data, programs, or applications for driving and controlling the AI upscaling apparatus 1200. A program stored in the memory 1230 may include one or more instructions. A program (one or more instructions) or application stored in the memory 1230 may be executed by the processor 1220.

The processor 1220 according to an embodiment of the present disclosure may perform at least one of operations of the receiver 410 and the AI decoder 430, which are described with reference to FIG. 4, or operations of the AI upscaling apparatus 400 described with reference to FIG. 10.

For example, the processor 1220 may obtain a second image based on image data received from an AI downscaling apparatus and may perform AI upscaling and artifact removal on the second image by performing, on the second image, an operation with second parameters included in a second DNN, thereby obtaining a third image.

The display 1240 according to an embodiment of the present disclosure generates driving signals by converting image signals, data signals, OSD signals, control signals, or the like, which are processed by the processor 1220. The display 1240 may be implemented by a plasma display panel (PDP), a liquid crystal display (LCD), an organic light-emitting diode (OLED) display, a flexible display, or the like and may also be implemented by a 3-dimensional (3D) display. In addition, the display 1240 may include a touchscreen and thus be capable of being used as an input device in addition to being used as an output device. The display 1240 may display the third image that is AI-upscaled and has undergone removal of artifacts.

Figure 13:
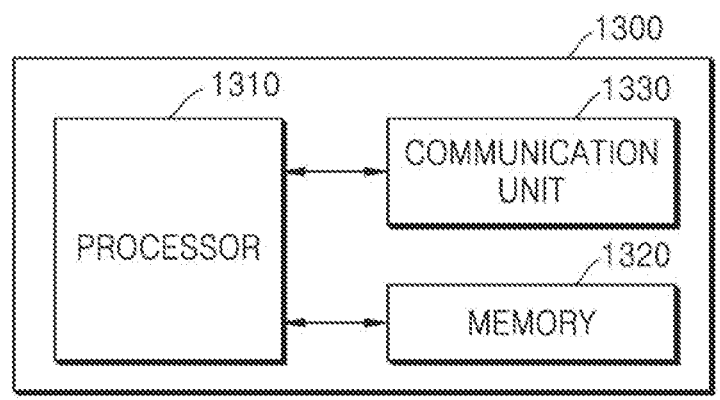
FIG. 13 is a block diagram illustrating a training apparatus for training a first DNN and a second DNN, according to an embodiment of the present disclosure.

FIG. 13 is a block diagram illustrating a configuration of a training apparatus for training a first DNN and a second DNN, according to an embodiment of the present disclosure.

Referring to FIG. 13, a training apparatus 1300 according to an embodiment of the present disclosure may include a communication unit 1330, a processor 1310, and a memory 1320. The processor 1310 according to an embodiment of the present disclosure may take overall control of the training apparatus 1300. The processor 1310 according to an embodiment of the present disclosure may execute one or more programs stored in the memory 1320.

The memory 1320 according to an embodiment of the present disclosure may store various data, programs, or applications for driving and controlling the training apparatus 1300. A program stored in the memory 1320 may include one or more instructions. A program (one or more instructions) or application stored in the memory 1320 may be executed by the processor 1310.

The processor 1310 according to an embodiment of the present disclosure may perform at least one of the training operations of the first DNN and the second DNN, which are described with reference to FIGS. 6 and 7.

The processor 1310 may train the first DNN and the second DNN jointly with each other, and when values of first parameters included in the first DNN and values of second parameters included in the second DNN are determined by completing the training of the first DNN and the second DNN, the processor 1310 may store the values in the memory 1320.

The communication unit 1330 according to an embodiment of the present disclosure may include one or more components allowing communications through a LAN, a wide area network (WAN), a value-added network (VAN), a mobile radio communication network, a satellite communication network, or a combination thereof.

The communication unit 1330 may transmit the parameters of the first DNN and the second DNN, which have been trained, to the AI downscaling apparatus 1100 or the AI upscaling apparatus 1200 according to an embodiment of the present disclosure. For example, the communication unit 1330 may transmit the first parameters of the first DNN to an AI downscaling apparatus and transmit the second parameters of the second DNN to an AI upscaling apparatus.

Each of the block diagrams of the AI downscaling apparatus 1100, the AI upscaling apparatus 1200, and the training apparatus 1300, which are respectively shown in FIGS. 11 to 13, is a block diagram for an embodiment of the present disclosure. The integration, addition of additional components, or omission may be performed on the respective components in the block diagrams, according to specifications of the AI downscaling apparatus 1100, the AI upscaling apparatus 1200, and the training apparatus 1300, which are actually implemented. That is, according to the need, two or more components may be integrated into one component, or one component may be subdivided into two or more components. In addition, a function performed by each block is for describing embodiments of the present disclosure, and a specific operation or apparatus thereof does not limit the scope of the present disclosure.

An operating method of an AI downscaling apparatus, an operating method of an AI upscaling apparatus, and a training method of a first DNN and a second DNN, according to an embodiment of the present disclosure, may be implemented in the form of a program executable by various computer means and may be recorded on a computer-readable recording medium. The computer-readable recording medium may include program instructions, data files, data structures, or the like alone or in combination. The program instructions recorded on the above-described medium may be designed and configured specially for the present disclosure or may be known and available to those of ordinary skill in the field of computer software. Examples of the computer-readable recording medium include magnetic media such as hard disks, floppy disks, and magnetic tape, optical media such as CD-ROM and DVDs, magneto-optical media such as floptical disks, and hardware devices specially configured to store and execute program instructions, such as ROM, RAM, and flash memory. Examples of the program instructions include machine language code made by compilers, and high-level language code that may be executed by computers by using interpreters or the like.

In addition, the operating method of an AI downscaling apparatus, the operating method of an AI upscaling apparatus, and the training method of a first DNN and a second DNN, according to the disclosed embodiments of the present disclosure, may be provided while included in a computer program product. The computer program product may be traded as merchandise between sellers and buyers.

The computer program product may include an S/W program, and a storage medium, which may be read by a computer, having the S/W program stored therein. For example, the computer program product may include merchandise (for example, a downloadable application) in the form of an S/W program electronically distributed through a manufacturer of an electronic device or through an electronic market (for example, Google Play Store, or App Store). For the electronic distribution, at least a portion of the S/W program may be stored in a storage medium or may be temporarily generated. In this case, the storage medium may be a storage medium of a server of the manufacturer, a storage medium of a server of the electronic market, or a storage medium of a relay server temporarily storing the S/W program.

The computer program product may include a storage medium of a server and a storage medium of a client device, in a system including the server and the client device. Alternatively, when there is a third device (for example, a smartphone) communicatively connected to the server or the client device, the computer program product may include a storage medium of the third device. Alternatively, the computer program product may include an S/W program itself, which is transmitted from the server to the client device or the third device or transmitted from the third device to the client device.

In this case, one of the server, the client device, and the third device may execute the computer program product, thereby performing the method according to the disclosed embodiments of the present disclosure. Alternatively, two or more of the server, the client device, and the third device may execute the computer program product, thereby dispersively performing the method according to the disclosed embodiments of the present disclosure.

For example, the server (for example, a cloud server, an AI server, or the like) may execute the computer program product stored in the server and thus control the client device, which is communicatively connected to the server, to perform the method according to the disclosed embodiments of the present disclosure.

Heretofore, while the embodiments of the present disclosure have been described in detail, the scope of the present disclosure is not limited thereto, and various changes and modifications made by those of ordinary skill in the art, by using the basic concepts of the present disclosure, which are defined in the appended claims, also fall within the scope of the present disclosure.

The invention claimed is:

1. An artificial intelligence (AI) upscaling apparatus comprising:
a memory storing one or more instructions; and
a processor configured to execute the one or more instructions stored in the memory,
wherein the processor is configured to execute the one or more instructions to:
obtain a second image corresponding to a first image which is downscaled from an original image by an AI downscaling apparatus by using a first deep neural network (DNN); and
obtain a third image by upscaling the second image by using a second DNN corresponding to the first DNN, and
wherein the second DNN is trained to minimize a difference between a first restored image for an original training image and second restored images for translation images obtained by applying first pixel movements to the original training image in first directions,
wherein the first restored image is obtained by performing downscaling by the first DNN on the original training image, and performing upscaling by the second DNN on the downscaled image, and
wherein the second restored images are obtained by performing downscaling by the first DNN on the translation images, performing upscaling by the second DNN on the downscaled translation images, and performing retranslation on the upscaled translation images by applying second pixel movements to the upscaled translation images in second directions reverse to the first directions.

2. The AI upscaling apparatus of claim 1, wherein the second DNN is trained to minimize loss information obtained based on at least one of the original training image, the first restored image for the original training image, or the second restored images for the translation images.

3. The AI upscaling apparatus of claim 2, wherein the loss information comprises first difference information between the original training image and each of the first restored image and the second restored images.

4. The AI upscaling apparatus of claim 2, wherein the loss information comprises second difference information between the first restored image and the second restored images.

5. The AI upscaling apparatus of claim 1, wherein the second DNN receives, as an input, a low-resolution single frame image for a particular time point in the second image and outputs a high-resolution single frame image for the particular time point in the third image.

6. The AI upscaling apparatus of claim 1, wherein the second DNN comprises a network that is trained jointly with the first DNN and trained based on an image obtained from the first DNN.

7. An artificial intelligence (AI) downscaling apparatus comprising:
a memory storing one or more instructions; and
a processor configured to execute the one or more instructions stored in the memory,
wherein the processor is configured to execute the one or more instructions to:
obtain a first image that is downscaled from an original image by using a first deep neural network (DNN); and
perform control to transmit the first image to an AI upscaling apparatus through a network, and
wherein the first DNN is trained to minimize a difference between a first restored image for an original training image and second restored images for translation images obtained by applying first pixel movements to the original training image in first directions,
wherein the first restored image is obtained by performing downscaling by the first DNN on the original training image, and performing upscaling by a second DNN on the downscaled image, and
wherein the second restored images are obtained by performing downscaling by the first DNN on the translation images, performing upscaling by the second DNN on the downscaled translation images, and performing retranslation on the upscaled translation images by applying second pixel movements to the upscaled translation images in second directions reverse to the first directions.

8. The AI downscaling apparatus of claim 7, wherein the first DNN is trained to minimize loss information obtained based on at least one of the original training image, the first restored image for the original training image, or the second restored images for the translation images.

9. The AI downscaling apparatus of claim 8, wherein the loss information comprises first difference information between the original training image and each of the first restored image and the second restored images.

10. The AI downscaling apparatus of claim 8, wherein the loss information comprises second difference information between the first restored image and the second restored images.

11. A method of training a first deep neural network (DNN) for downscaling a high-resolution image to a low-resolution image or a second DNN for upscaling a low-resolution image to a high-resolution image, the method comprising:
generating translation images by applying first pixel movement to an original training image in first directions;
obtaining a downscaled image by performing downscaling by the first DNN on the original training image and obtaining downscaled translation images by performing downscaling by the first DNN on the translation images;
obtaining a first restored image by performing upscaling by the second DNN on the downscaled image and obtaining second restored images by performing upscaling by the second DNN on the downscaled translation images and performing retranslation on the upscaled translation images by applying second pixel movements to the upscaled translation images in second directions reverse to the first directions; and
updating at least one of first parameters of the first DNN or second parameters of the second DNN to minimize a difference between the first restored image for the original training image and the second restored images for the translation images by using loss information obtained based on at least one of the original training image, the first restored image for the original training image, or the second restored images for the translation images.

12. The method of claim 11, wherein the loss information comprises first difference information between the original training image and each of the first restored image and the second restored images.

13. The method of claim 11, wherein the loss information comprises second difference information between the first restored image and the second restored images.

14. The method of claim 11, wherein the updating of at least one of the first parameters of the first DNN or the second parameters of the second DNN comprises updating at least one of the first parameters of the first DNN or the second parameters of the second DNN toward minimizing the loss information.

15. The method of claim 11, wherein the second DNN comprises a network that is trained jointly with the first DNN and trained based on an image obtained from the first DNN.

* * * * *